(12) United States Patent
Fukuda

(10) Patent No.: US 6,604,343 B2
(45) Date of Patent: Aug. 12, 2003

(54) LATITUDINAL SEALING MECHANISM FOR BAG-PACKAGING MACHINE AND A BAG PACKAGING MACHINE HAVING THE SAME

(75) Inventor: Masao Fukuda, Shiga (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 10/060,380

(22) Filed: Feb. 1, 2002

(65) Prior Publication Data

US 2002/0073660 A1 Jun. 20, 2002

Related U.S. Application Data

(62) Division of application No. 09/472,064, filed on Dec. 23, 1999.

(30) Foreign Application Priority Data

Jan. 8, 1999 (JP) ............................................... 11-2878
Jan. 8, 1999 (JP) ............................................... 11-2879

(51) Int. Cl.[7] ............................. B65B 9/20; B65B 51/30
(52) U.S. Cl. .......................... 53/551; 53/552; 53/374.6; 53/375.4
(58) Field of Search ......................... 53/550, 551, 552, 53/374.4, 374.6

(56) References Cited

U.S. PATENT DOCUMENTS

| | | | |
|---|---|---|---|
| 3,483,173 A | 12/1969 | Omori | |
| 3,629,987 A | 12/1971 | Klopfenstein et al. | |
| 3,850,780 A | 11/1974 | Crawford et al. | |
| 4,164,833 A | 8/1979 | Todd | |
| 4,663,917 A | * 5/1987 | Taylor | ........................... 53/552 |
| 4,750,313 A | 6/1988 | Kammler et al. | |
| 4,905,446 A | * 3/1990 | Dieckbernd et al. | ........ 53/374.4 |
| 5,031,386 A | 7/1991 | Schneider | |
| 5,094,657 A | * 3/1992 | Dworak et al. | ............. 53/374.4 |
| 5,347,795 A | * 9/1994 | Fukuda | .......................... 53/552 |
| 5,622,033 A | 4/1997 | Fukuda | |
| 5,685,131 A | * 11/1997 | Spatolisano | ................ 53/374.6 |

FOREIGN PATENT DOCUMENTS

| | | |
|---|---|---|
| DE | 4105158 A1 | 11/1991 |
| EP | 0863080 A1 | 9/1998 |
| JP | 10-86910 A1 | 4/1998 |

* cited by examiner

Primary Examiner—John Sipos
(74) Attorney, Agent, or Firm—Shinjyu Global IP Counselors, LLP

(57) ABSTRACT

A latitudinal seal mechanism includes seal jaws 78, fixed cams 75, cam followers 76, a pair of partial cams 88, partial cam followers 78a, rotational shafts 80, coupling members 79, and shaft support portions. The seal jaws 78 are heated, and move circularly such that the seal jaws 78 abut on and move away from tubular film. The fixed cams 75 have shapes that correspond to locuses of movement of the seal jaws 78. The cam followers 76 support the seal jaws 78, and move along the fixed cams 75. The rotational shafts 80 move the cam followers 76 relatively about rotational centers of the rotational shafts 80. The coupling members 79 couple the rotational shafts 80 and the cam followers 76. The shaft support portions rotatably support the rotational shafts 80. The partial cams 88 have a shape that corresponds to a locus of movement of the pair of seal jaws 78 when the pair of seal jaws 78 holds the tubular packaging films. The partial cams 88 make the pair of seal jaws 78 press against each other with the partial cam followers 78a therebetween. The partial cam followers 78a are supported by the pair of seal jaws 78. The partial cam followers 78a engage the corresponding partial cams 88 when the pair of seal jaws 78 holds the tubular packaging film therebetween.

11 Claims, 17 Drawing Sheets

LATITUDINAL SEALING MECHANISM FOR BAG-PACKAGING MACHINE AND A BAG PACKAGING MACHINE HAVING THE SAME

CROSS-REFERENCE TO RELATED APPLICATIONS

This application is a divisional application of copending U.S. patent application Ser. No. 09/472,064 filed on Dec. 23, 1999.

BACKGROUND OF THE INVENTION

A. Field of the Invention

The present invention relates to a latitudinal sealing mechanism for use in a bag-packaging machine. More specifically, the present invention relates to a latitudinal seal mechanism for use in a bag-packaging machine that fills articles to be packaged in a bag while packaging the bag by sealing tubular packaging material longitudinally and latitudinally. The present invention also relates to such bag-packaging machine.

B. Description of the Related Art

There has been a longitudinal bag-packaging machine that fills articles such as foods to be packaged in a bag while manufacturing and packaging the bag.

For instance, a longitudinal pillow packaging machine forms a packaging material which is a sheet-shaped film into tubular shape by using a former and a tube. Longitudinal seal means (heat sealing) seals longitudinal edges of the tubular packaging materials that are placed one on top of another, thereby making bags. The pillow packaging machine fills articles to be packaged into the tubular packaging materials through the tube. Latitudinal sealing mechanism below the tube seals the upper portion of a bag and the bottom portion of an following bag. Then the pillow packaging machine cuts the middle of the latitudinally sealed portion. In such pillow packaging machine, operations of making a bag and filling articles in the bag occur in a continuous manner.

An example of such bag packaging machine is disclosed in Japanese Laid-Open Patent Application 10-86910. In the packaging machine disclosed therein, the tubular packaging material is sealed latitudinally by heating and pressing a pair of seal portions called seal jaws against each other, with the pair of seal jaws opposing each other across the conveyance path of the tubular packaging material. In a structure where the seal jaws simply repeat linear back and forth movements, the packaging material is sealed only at a point (a line). Therefore, conveyance of the packaging material has to be stopped while the packaging material is being sealed in this structure. To avoid this problem, each seal jaw is controlled by two kinds of motors, such that each seal jaw moves drawing a locus that is in the shape of letter D. In this way, enough sealing time is secured while conveying the tubular packaging material continuously, by having the seal jaws follow the tubular packaging material. Motors used in this bag packaging machine for controlling each sealing jaw include, a rotational motor for rotating each seal jaw, and a horizontal motor for moving each seal jaw horizontally back and forth.

Some of such mechanisms utilize a cam having a groove formed thereon, so as to engage inner and outer sides of a cam follower. U.S. Pat. No. 5,031,386 discloses one of such mechanisms. In this mechanism, a cam follower that supports a seal jaw engages a cam having a groove that is formed in the shape of the letter D. The cam follower and the seal jaw are supported by an end of a drive member fixed to a shaft. As the shaft rotates, the cam follower and the seal jaw move along the groove on the cam. In this manner, the seal jaw moves drawing a locus in the shape of letter D.

Problem to be Solved by the Invention

Although the aforementioned mechanism allows the seal jaw to move drawing a locus in the shape of letter D, the seal jaw and the cam follower need to be able to slide against the drive member, since the seal jaw moves drawing a locus in the letter of D instead of a circle while the drive member rotates.

However, it is structurally difficult to configure a sliding mechanism having bearings in the portion where sliding needs to occur. Consequently, the seal jaw and the cam follower have to slide against the drive member by contacting and slipping against the drive member. Furthermore, if multiple cam followers are coupled to the cam to increase the processing speed of the bag packaging machine, the mechanism is subject to even more strict space constraint. Also, as the processing speed of the bag packaging machine increases, the slip-sliding by the cam follower and the seal jaw against the drive member may lead to a durability problem of the latitudinal sealing mechanism.

Further, packaging materials are becoming thinner recently. Accordingly, more pressure is required to seal the packaging material. This causes a greater reactionary force in the structure that supports each seal jaw. Especially in the structure disclosed in the aforementioned applications, reactionary force occurs in the horizontal motor that moves each seal jaw horizontally back and forth. Consequently, the horizontal motor has to be able to generate a torque that is large enough to be able to oppose the reactionary force. In other words, the horizontal motor is required of extra functions that would not be necessary if the horizontal motor were simply moving seal jaws horizontally. Also, the rotational motor has to rotate each seal jaw (in a downward direction) pushing the seal jaw against the reactionary force applied to each seal jaw. Therefore, the rotational motor also needs to be able to generate torque that is comparable to the torque of the horizontal motor.

In the structure where two kinds of motors rotate each seal jaw so as to draw a locus in the shape of letter D and thereby generate sealing pressure, the magnitude of sealing pressure can be easily adjusted by adjusting the horizontal motor. On the other hand, such structure requires a high-powered motor that can generate torque comparable with the sealing pressure, which leads to a higher cost of the bag packaging machine.

In view of the above, there exists a need for an improved latitudinal seal mechanism for a bag packaging machine which overcomes the above mentioned problems in the prior art. This invention addresses this need in the prior art as well as other needs, which will become apparent to those skilled in the art from this disclosure.

SUMMARY OF THE INVENTION

The object of the present invention is to provide a latitudinal seal mechanism for use in a bag packaging machine that utilizes a cam, with the latitudinal seal mechanism allowing a seal portion to move drawing a locus in a shape other than a near circle having the shape of the letter D, without utilizing a structure in which the cam follower and the seal portion (seal jaw) slide against a coupling member (drive member) fixed to a rotational shaft (shaft).

In accordance with one aspect of the present invention, there is a latitudinal seal mechanism for use in a bag packaging mechanism that fills articles to be packaged while sealing a tubular packaging material in longitudinal and latitudinal directions. The latitudinal sealing mechanism includes a seal portion, a fixed cam, a cam follower, a rotational shaft, a coupling member, and a shaft support portion. The seal portion is adapted to be heated and move circularly, such that the seal portion abuts on and moves away from the tubular packaging material. The fixed cam has a shape that corresponds to a locus of the movement of the seal portion. The cam follower supports the seal portion and is adapted to move along the fixed cam. The rotational shaft relatively moves the cam follower circularly about a rotational center of the rotational shaft. The coupling member couples the rotational shaft and the cam follower. The shaft support portion supports the rotational shaft such that the rotational shaft can move in a direction that crosses with a direction of an axial core of the rotational shaft.

The latitudinal seal mechanism moves the heated seal portion circularly, such that the seal portion seals the tubular packaging material by heat when the seal portion abuts on the tubular packaging material. The fixed cam has a shape that corresponds to the locus of the movement of the seal portion such that sealing conditions such as sealing time are satisfied. The sealing portion is supported by the cam follower which moves along the fixed cam. The cam follower moves drawing a predetermined locus, thereby sealing the tubular packaging material.

The cam follower is coupled to the rotational shaft via the coupling member. If the rotational shaft is fixed, the cam follower cannot move but circularly. Therefore, in the latitudinal seal mechanism of the present invention, the shaft support portion supports the rotational shaft such that the rotational shaft can move in a direction that crosses with the direction of the axial core (direction of length), for instance in a perpendicular direction. In other words, in a conventional latitudinal seal mechanism, the cam follower and the coupling member had to slide against each other to allow the cam follower to move in a non-circular manner along the fixed cam. On the other hand, in the latitudinal seal mechanism of the present invention, the rotational shaft moves relative to the fixed cam, unlike the conventional rotational shaft which is fixed to the fixed cam. When the rotational shaft is movably supported, there is relatively more flexibility as to where the shaft support portion should be disposed. Also, since there is larger space in which the shaft support portion can be disposed, the shaft support portion can include a slide mechanism having rollers, or a pendulum-type support mechanism.

Therefore, the present invention eliminates conventional structure where the coupling member fixed to the rotational shaft slides against the cam follower and the seal portion. In this way, the present invention provides a more durable, desirable structure that can make the seal portion move drawing a locus other than a circle, such as one in the shape of letter D.

In accordance with another aspect of the present invention a latitudinal seal mechanism is adapted for use in a bag packaging mechanism that fills articles to be packaged while sealing a tubular packaging material in longitudinal and latitudinal directions. The latitudinal sealing mechanism includes a pair of seal portions, fixed cams, cam followers, rotational shafts, coupling members, and shaft support portions. The pair of seal portions is adapted to be heated and move circularly, such that the seal portions hold the tubular packaging material therebetween. The fixed cams have shapes that correspond to a locus of the movement of each of the seal portions. The cam followers each support the seal portion, and are adapted to move along the fixed cams. The rotational shafts relatively move the cam followers circularly about rotational centers of the rotational shafts. The coupling members couple the rotational shafts and the cam followers. The shaft support portions support the rotational shafts such that the rotational shafts can move in a direction that crosses with direction of the axial core of the rotational shaft.

In this latitudinal seal mechanism, the heated pair of seal portions moves circularly, and closes the packaging material by heat by holding the tubular packaging material therebetween. The latitudinal seal mechanism utilizes fixed cams having shapes that correspond to the locuses of the movement of the seal portions, such that the sealing conditions such as sealing time are satisfied. Each seal portion is supported by the cam follower that moves along the corresponding fixed cam. The seal portions move drawing predetermined locuses, thereby sealing the tubular packaging material.

The cam followers are coupled to the rotational shafts via the coupling members. If the rotational shafts are fixed, the cam followers cannot move but circularly. Therefore, in the latitudinal seal mechanism of the present invention, the shaft support portion supports the rotational shafts such that the rotational shafts can move in directions that cross with the directions of the axial cores, for instance in a perpendicular direction. In other words, in a conventional latitudinal seal mechanism, the cam followers and the coupling members had to slide against each other to allow the cam followers move in a non-circular manner. On the other hand, in the latitudinal seal mechanism of the present invention, the rotational shafts move relative to the fixed cams, unlike the conventional rotational shafts which are fixed to the fixed cams. Therefore, when the rotational shafts are movably supported against the fixed cams, there is relatively more flexibility as to where the shaft support portions should be disposed. Also, since there is larger space in which the shaft support portions can be disposed, the shaft support portions can include a slide mechanism having rollers, or a pendulum-type support mechanism.

Therefore, the present invention eliminates conventional structure where the coupling members fixed to the rotational shafts slide against the cam followers and the seal portions. The present invention provides a more durable, desirable structure that can make the seal portion move drawing a locus other than a circle, such as one in the shape of letter D.

Preferably, in the latitudinal seal mechanism, at least two of the cam followers are disposed for each fixed cam. First and second cam followers, out of all the cam followers, are disposed on opposite sides of the rotational shaft with the rotational shaft therebetween. The first and second cam followers are supported by ends of the coupling member, with a middle portion of the coupling member being fixed to the rotational shaft.

Since a plurality of cam followers is disposed for each fixed cam, sealing can be conducted multiple times per one rotation of the rotational shaft. Consequently, the bag packaging machine will be more effective (speedy).

Also, in this embodiment, the first and second cam followers are disposed so as to hold the rotational shaft therebetween. Then, the first and second cam followers are coupled by the coupling member. Therefore, the cam followers move along the fixed cams even when the fixed cam is a plate cam that engages only an inner side of the cam follower, instead of a groove cam having a groove that couples both inner and outer sides of the cam follower. In other words, the cam followers do not disengage the fixed cams, even when the fixed cam is a plate cam. By allowing the rotational shaft to move relative to the fixed cam and couple the first and second cam followers to the rotational shaft via the coupling member, the fixed cam can use a plate cam which has a simpler structure than a groove cam.

Preferably, in the latitudinal seal mechanism, the fixed cams have such shapes that make the pair of seal portions move drawing locuses that have approximately the shapes of letter D and inverted letter D.

Since the pair of seal portion moves drawing the locuses that have approximately the shapes of letter D and inverted letter D, the seal portions can hold the tubular packaging material therebetween while they move approximately linearly. Therefore, the pair of seal portions can seal the packaging material for a predetermined sealing time even while the tubular packaging material is being conveyed.

Preferably, in the latitudinal seal mechanism, the rotational shafts repeat stopping and linear back and forth movement as they rotate, due to movement of the cam followers coupled to the fixed cams.

When the rotational shafts are supported by the shaft support portions so as to allow the rotational shafts to slide linearly, the rotational shafts repeat stopping and linear back and forth movement, as the seal portions move drawing locuses other than a circle such as ones in the shapes of letter D.

Preferably, the rotational shafts repeat stopping and arc-shaped back and forth movement as they rotate, due to movement of the cam followers coupled to the fixed cams.

When the rotational shafts are supported by the shaft support portions so as to allow the rotational shafts to slide drawing an arc, the rotational shafts repeat stopping and arc-shaped back and forth movement, as the seal portions move drawing locuses other than a circle such as ones in the shapes of letter D.

Preferably, the rotational shafts are rotatably supported by bearings. The shaft support portions support the bearings such that the bearings can move in a direction that cross with the direction of the axial core of the rotational shaft.

The bearings for rotatably supporting the rotational shafts are movably supported by the shaft support portions. Therefore, the shaft support portion can utilize a support mechanism in which the bearings slide linearly with little friction, or in which the bearings support the rotational shaft via an arm such that the bearing can move in the shape of an arc.

Preferably, each of the fixed cams includes an elongated bore formed thereon. The rotational shafts pass through the elongated bores of the fixed cams.

The fixed cams include an elongated bore, which is an elongate opening. Therefore, the rotational shafts that move relative to the fixed cams can cross with the fixed cams. Consequently, there is more flexibility as to where to dispose the shaft support portions that support the bearing. There is also larger space in which the shaft support portion can be disposed. Therefore, the shaft support portion can utilize a durable mechanism such as a slide mechanism having rollers or pendulum type support mechanism.

In accordance with still another aspect of the present invention there is a latitudinal seal mechanism for use in a bag packaging mechanism that fills articles to be packaged while sealing a tubular packaging material in longitudinal and latitudinal directions. The latitudinal sealing mechanism includes a seal portion, a fixed cam, a cam follower, a rotational shaft, and a coupling member. The seal portion is adapted to be heated and move circularly, such that the seal portion abuts on and moves away from the tubular packaging material. The fixed cam has a shape that corresponds to a locus of the movement of the seal portion. The cam follower supports the seal portion and is adapted to move along the fixed cam. The rotational shaft relatively moves the cam follower circularly about a rotational center of the rotational shaft. The coupling member couples the rotational shaft and the cam follower. The rotational shaft is adapted to move in a direction that crosses with a direction of its axial core due to movement of the seal portion and cam follower.

In the latitudinal seal mechanism, the heated seal portion moves circularly, and seals the tubular packaging material by heat when the seal portion abuts thereon. The shape of the fixed cam corresponds to the shape of the locus of the seal portion, such that sealing conditions such as sealing time are satisfied. The seal portion is supported by the cam follower that moves along the fixed cam. The seal portions move drawing predetermined locus, thereby sealing the tubular packaging material.

The cam follower is coupled to the rotational shaft via the coupling member. If the rotational shaft is fixed, the cam follower cannot move but circularly. Therefore, in the latitudinal seal mechanism of the present invention, the rotational shaft is supported such that the rotational shaft can move relative to the fixed cam in a direction that crosses with the direction of the axial core, for instance in a direction perpendicular to the direction of the axial core. In other words, in a conventional latitudinal seal mechanism, the cam follower and the coupling member had to slide against each other to allow the cam follower to move in a non-circular manner. On the other hand, in the latitudinal seal mechanism of the present invention, the rotational shaft moves relative to the fixed cam, unlike the conventional rotational shaft which is fixed to the fixed cam. Therefore, when the rotational shaft is movably supported against the fixed cam, there is more flexibility as to where the shaft support portion should be disposed. Also, since there is larger space in which the shaft support portion can be disposed, the shaft support portion can include a slide mechanism having rollers or a pendulum-type support mechanism.

Therefore, the present invention eliminates conventional structure where the coupling member fixed to the rotational shaft slides against the cam follower and the seal portion. The present invention provides a more durable, desirable structure that can make the seal portion move drawing a locus other than a circle, such as one in the shape of letter D.

In still another aspect of the present invention there is a bag packaging mechanism that fills articles to be packaged while sealing a tubular packaging material in longitudinal and latitudinal directions. The bag packaging mechanism includes forming means, a packaging material conveyance mechanism, a longitudinal seal mechanism, and a latitudinal seal mechanism. The forming means forms a sheet-shaped packaging material supplied thereto in tubular shape while receiving the articles to be packaged. The packaging material conveyance mechanism conveys the tubular packaging material in a downward direction. The longitudinal seal mechanism seals in a longitudinal direction overlapping portions of the tubular packaging material conveyed thereto. The latitudinal seal mechanism is a latitudinal seal mechanism described above, and seals in a latitudinal direction portions of the tubular packaging material conveyed thereto with a predetermined distance therebetween.

In still yet another aspect of the present invention there is a latitudinal seal mechanism of a bag packaging machine, where the horizontal motor does not oppose the sealing pressure and therefore can be reduced in size. Alternatively, the latitudinal seal mechanism does not utilize a horizontal motor but generates sealing pressure, in which the sealing pressure can be configured.

In accordance with still another aspect of the present invention there is a latitudinal seal mechanism for use in a bag packaging mechanism that fills articles to be packaged while sealing a tubular packaging material in longitudinal and latitudinal directions. The latitudinal sealing mechanism comprises a pair of seal portions, a pair of partial cams, and partial cam followers. The pair of seal portions is adapted to be heated and move circularly, such that the seal portions hold the tubular packaging material therebetween. The pair of partial cams has a shape that corresponds to a locus that the pair of seal portions draws when the pair of seal portions holds the tubular packaging material therebetween. The pair of fixed cams makes the pair of seal portions press against each other. Each of the partial cam followers is supported by the pair of seal portions. The partial cam followers engage corresponding partial cams when the pair of seal portions holds the tubular packaging material therebetween.

This latitudinal seal mechanism moves the heated pair of seal portions circularly, such that the seal portions crimp by heat (seal) the tubular packaging material by holding the tubular packaging material therebetween. This latitudinal seal mechanism also includes a pair of partial cams and partial cam followers for securing sealing pressure. Each of the partial cam followers engages the partial cam.

The partial cam follower is supported by the seal portion. As each of the seal portions moves circularly, the partial cam followers engage the partial cams shortly before the pair of seal portions holds the tubular material, while the pair of seal portions holds the tubular material therebetween, and shortly thereafter. The pair of seal portions crimps the tubular packaging material by heat through pressure applied from the partial cams via the partial cam followers, while the partial cam followers engage the partial cams.

Here, the reactionary force that occurs in the seal portions during the sealing is applied to the partial cams via the partial cam followers. Therefore, by fixedly disposing the partial cams and/or by allowing the partial cams to generate force that opposes the reactionary force of the seal portions, the driving means that move the seal portions circularly are not affected by the reactionary force of the seal portions.

Preferably, the latitudinal seal mechanism should comprise pressure means for applying pressure to the partial cams such that the pair of seal portions press against each other when the pair of seal portions holds the tubular packaging material therebetween.

The reactionary force of the seal portions applied to the partial cams via the partial cam followers is at equilibrium with the pressure applied from the pressure means to the partial cams. Therefore, while the pair of seal portions holds the tubular packaging material therebetween, the seal portions are pressed against each other. In this manner, the tubular packaging material can be sealed securely with a predetermined pressure.

By allowing the pair of seal portions to separate from each other while the pressure means does not apply pressure to the partial cams, pressure can be applied by the pressure means to the partial cams only when the tubular packaging material needs to be sealed. When the tubular packaging material does not need to be sealed, for instance when the quality of articles to be packaged is not guaranteed, the pressure means can be configured not to apply pressure to the partial cams. In this manner, substandard articles can be thrown away before they are packaged.

Preferably, the latitudinal seal mechanism should comprise pressure adjustment means for adjusting the magnitude of pressure that the pressure means applies to the partial cams.

By adjusting the magnitude of pressure that the pressure means applies to the partial cams, the pressure by which the seal portions press against each other, in other words the sealing pressure can be adjusted. In this manner, besides that the sealing pressure can be secured by the partial cams and the partial cam followers, the sealing pressure can also be adjusted by the pressure adjustment means.

Preferably, in the latitudinal seal mechanism, the pair of partial cams is connected via a link mechanism. The pressure means applies force to a portion of the link mechanism in a direction that crosses with a direction in which the pair of seal portions is pressed against each other.

Here, the link mechanism connects the partial cams. The sealing pressure is generated by applying pressure to a portion of the link mechanism. Therefore, only one pressure means generates sealing pressure for partial cams, instead of having to dispose pressure means for each partial cam.

In this mechanism, the pressure means applies pressure not in a direction in which the pair of seal portions is pressed against each other (sealing pressure direction), but in a direction that crosses with the sealing pressure direction). In this manner, greater sealing pressure can be generated with smaller pressure.

Preferably, in the latitudinal seal mechanism, the pair of partial cam includes on each opposing surface an entrance surface, a pressure surface, and an exit surface. The pressure surface is formed immediately below the entrance surface. The exit surface is formed immediately below the pressure surface. The pair of seal portions receives no pressure applied thereto while the partial cam followers engage the entrance surfaces. The pair of seal portions is pressed against each other while the partial cam followers engage the pressure surfaces. The pair of seal portions receives no pressure applied thereto while the partial cam followers engage the exit surfaces.

As the partial cam followers supported by the seal portions that move circularly approach the partial cams, the partial cam followers first contact and engage the entrance surfaces. At this point, the pair of seal portions is apart from each other. Therefore, the tubular packaging material receives no pressure applied thereto.

As the seal portions are passed downward, and as the partial cam followers engage the pressure surfaces, the pair of seal portion is now pressed against each other. The tubular packaging material is sealed while the partial cam followers engage the pressure surfaces.

As the seal portions are passed further downward, the partial cam followers now engage the exit surfaces. The pair of seal portions separates.

By disposing the entrance and exit surfaces above and below the pressure surface, the partial cam followers can engage and disengage the partial cams smoothly. Therefore, the drive means does not need to output much power to move the seal portions.

Preferably, the latitudinal seal mechanism further comprises a pair of fixed cams, cam followers, and driving means. The pair of fixed cams has a shape corresponding to a locus of each of the pair of seal portions. The cam followers are adapted to support the seal portions and move such that the seal portions are engaged with the fixed cams. The driving means moves the cam followers.

In this latitudinal seal mechanism, the heated pair of seal portions moves circularly, and seals the tubular packaging material by holding the tubular packaging material therebetween. A locus of the seal portions is designed to meet desired sealing conditions such as sealing time. The latitudinal seal mechanism utilizes fixed cams having a shape that corresponds to the locus of the seal portions, such that the seal portions move drawing the locus. Each seal portion is supported by a cam follower that moves along a fixed cam such that the cam follower remains engaged with the fixed cam. In this manner, the seal portions move drawing the predetermined locus, thereby sealing the tubular packaging material.

In the aforementioned arrangement where the fixed cams and the cam followers make the seal portions move so as to draw a predetermined locus, the partial cams and partial cam followers secure sealing pressure, as well as enable easy adjustment of sealing pressure.

Preferably, in the latitudinal seal mechanism, the cam follower supports the seal portion via an elastic member that extends when the partial cam follower engages the partial cam.

In this latitudinal seal mechanism, the seal portion moves along the fixed cam with the elastic member therebetween. When the partial cam follower engages the partial cam, the elastic member extends, such that the cam follower remains engaged with the fixed cam. Even if reactionary force occurs in the seal portions that press against each other, the reactionary force is transmitted to the partial cams via the partial cam followers. Therefore, the reactionary force does not affect the elastic members, cam followers, or fixed cams.

More specifically, the latitudinal seal mechanism includes cam followers that move so as to remain engaged with fixed cams. However, the cam followers alone cannot make the seal portions contact each other; there always remains a gap between the seal portions as long as the seal portions are supported only by the cam followers. The latitudinal seal mechanism also includes partial cam followers and partial cams. The partial cam followers and partial cams are disposed such that the seal portions are pressed against each other when the partial cam followers engage the partial cams. While the partial cam follower engage the partial cams, the seal portions are supported by the partial cams, instead of the fixed cams.

Preferably, in the latitudinal seal mechanism, the driving means moves the cam followers via a rotational shaft and a coupling member. The driving means member is adapted to rotate the rotational shaft. The rotational shaft is adapted to rotate the cam follower relatively circularly about a rotational center of the rotational shaft. The coupling member connects the rotational shaft and the cam follower. The rotational shaft is adapted to move relative to the fixed cam in a direction that crosses with a direction of the length of the rotational shaft, due to movement of the seal portion and the cam follower.

The cam followers are coupled to the rotational shafts. If the rotational shafts are fixedly coupled, the cam followers cannot move but circularly. However, in this latitudinal seal mechanism, the rotational shafts can move in a direction that crosses with the direction of the length thereof, for instance in a direction perpendicular to the direction of the length thereof.

Preferably, in the latitudinal seal mechanism, the pair of seal portions rubs the tubular packaging material through a movement of said cam followers with a predetermined gap maintained between the pair of seal portions, before the partial cam followers engage the partial cams. The pair of seal portions also seals the tubular packaging material by holding the tubular packaging material therebetween while the partial cam followers engage the partial cams.

In this latitudinal seal mechanism, the pair of seal portions rubs the tubular packaging material with a predetermined gap maintained between the pair of seal portions, before the tubular packaging material is sealed latitudinally. This rubbing is achieved by the cam followers moving along the fixed cams. Since the tubular packaging material is rubbed before it is sealed, articles that are in the sealing portion of the tubular packaging material are pushed downward. Consequently, improper sealing that occurs due to articles sealed with the sealing portion of the tubular packaging can be avoided.

On the other hand, the tubular packaging material has to be pressed against each other to seal properly. This pressing operation is achieved by the partial cams and partial cam followers.

Preferably, in the latitudinal seal mechanism, a speed at which the driving means moves the cam follower while the pair of seal portions rubs the tubular packaging material is faster than a speed at which the driving means moves the cam follower while the pair of seal portions holds the tubular packaging material therebetween.

Since the speed at which the seal portions rub the tubular packaging portion is faster than the speed at which the tubular packaging material is sealed, there is enough area in which the tubular packaging material is rubbed.

In accordance with still another aspect of the present invention there is a bag packaging mechanism that fills articles to be packaged while sealing a tubular packaging material in longitudinal and latitudinal directions. The bag packaging mechanism comprises forming means, a packaging material conveyance mechanism, a longitudinal seal mechanism, and a latitudinal seal mechanism. The forming means forms a sheet-shaped packaging material supplied thereto in tubular shape while receiving the articles to be packaged. The packaging material conveyance mechanism conveys the tubular packaging material in a downward direction. The longitudinal seal mechanism seals in a longitudinal direction overlapping portions of the tubular packaging material conveyed thereto. The latitudinal seal mechanism is a latitudinal seal mechanism described above, and seals in a latitudinal direction portions of the tubular packaging material conveyed thereto with a predetermined distance therebetween.

These and other objects, features, aspects and advantages of the present invention will become more fully apparent from the following detailed description of the present invention when taken in conjunction with the accompanying drawings where like reference numerals denote corresponding parts throughout.

BRIEF DESCRIPTION OF THE DRAWINGS

Referring now to the accompanying drawings which form a part of this original disclosure.

DETAILED DESCRIPTION OF THE INVENTION

First Embodiment

Overall Structure

Figure 1:
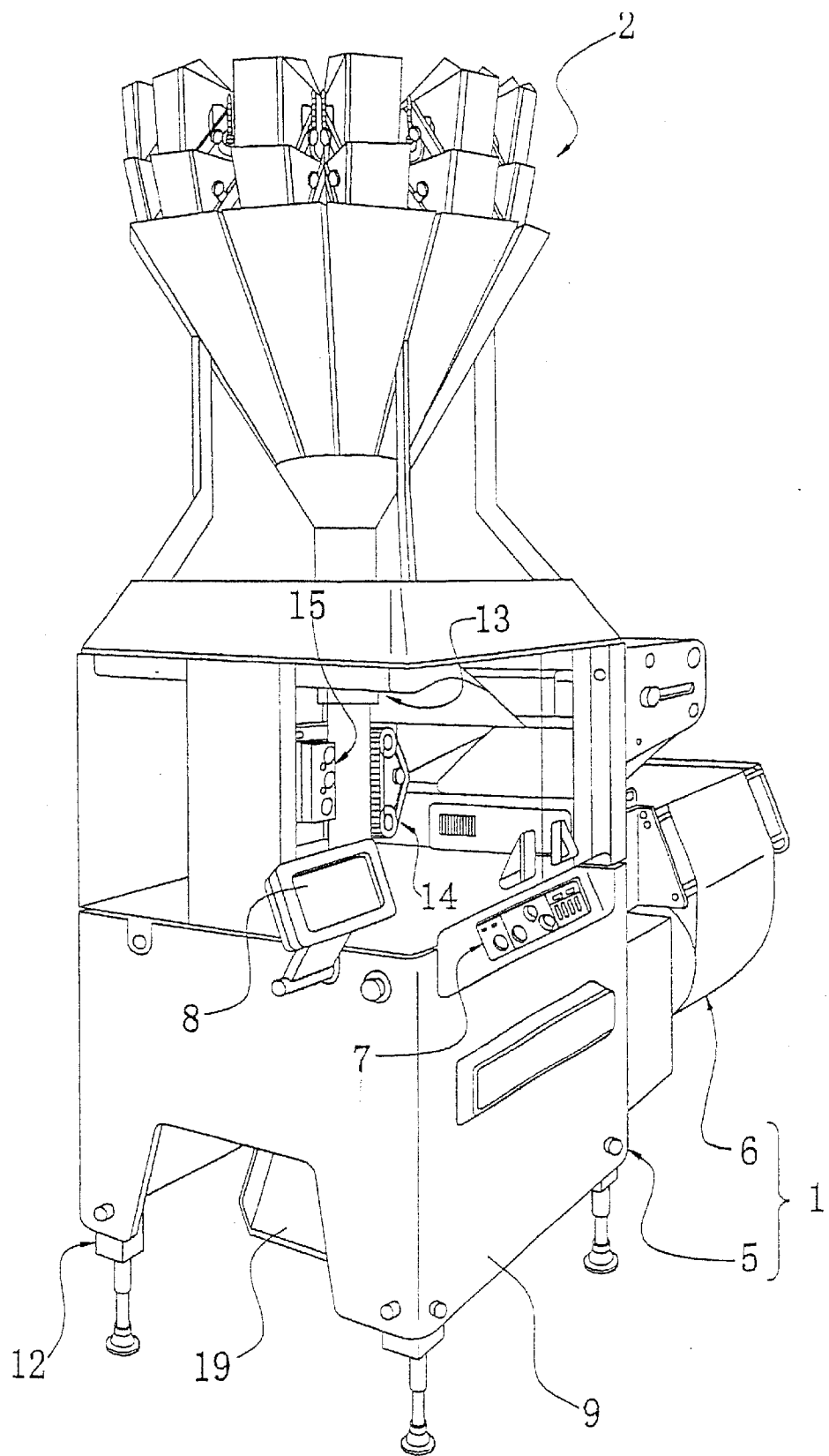
FIG. 1 is a perspective view of a bag packaging machine in accordance with a first embodiment of the present invention.
Figure 3:
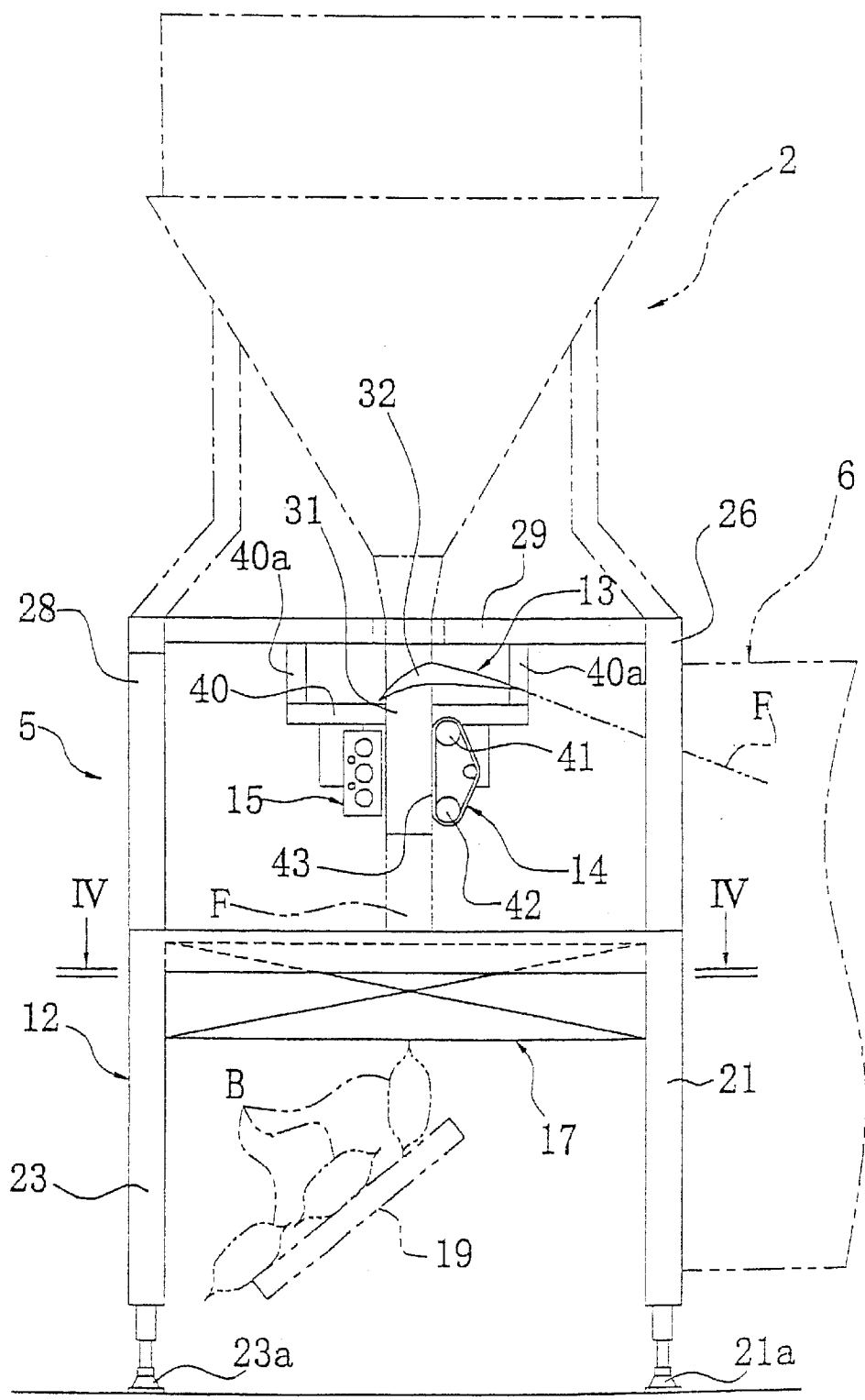
FIG. 3 is a side view of a bag packaging unit of the bag packaging machine depicted in FIG. 1 in accordance with the present invention.

FIGS. 1 and 3 show a bag packaging machine in accordance with the first embodiment of the present invention. The bag packaging machine 1 shown therein is a machine for packaging, for instance, potato chips, and mainly includes a bag packaging unit 5 and a film supply unit (packaging material supply unit) 6. The bag packaging unit 5 is a main portion of the bag packaging machine 1, in which potato chips are filled in bags. The film supply unit 6 supplies film to the bag packaging unit 5 such that the bags can be made from the film. On the front surface of the bag packaging unit 5 are various operational switches 7. A LCD display 8 that shows operational status of the bag packaging machine 1 is also disposed on a certain position such that an operator who operates the operational switches 7 can visually recognize the display 8.

Structure of Each Unit

The film supply unit 6 supplies sheet-shaped film to a forming mechanism 13 of the bag packaging unit 13. In the first embodiment, the film supply unit 6 is disposed adjacent to the bag packaging unit 5. The film supply unit 6 includes a roll of film, out of which film is supplied. Since replacement a roll requires a certain amount of space around the film supply unit 6, the film supply unit 6 does not need to be adjacent to the bag packaging unit 5. Instead, the film supply unit 6 and the bag packaging unit 5 can be disposed apart from each other.

Referring to FIGS. 1 and 3, the bag packaging unit 5 includes a forming mechanism 13, a pull-down belt mechanism (packaging material conveyance mechanism) 14, a longitudinal seal mechanism 15, a latitudinal seal mechanism 17, and a support frame 12. The forming mechanism 13 forms the sheet-shaped films into a tubular shape. The pull-down belt mechanism 14 conveys the film formed in the tubular shape (hereinafter referred to as tubular film) in a downward direction. The longitudinal seal mechanism 15 seals (heat-seals) overlapping portions of the tubular film in a longitudinal direction to form the tubular shape of the tubular film. The latitudinal seal mechanism 17 seals the tubular film in a latitudinal direction, thereby closing upper and bottom ends of the tubular film thereby forming sealed bags. The support frame 12 supports these mechanisms. A casing 9 is disposed around the support frame 12.

Figure 2:
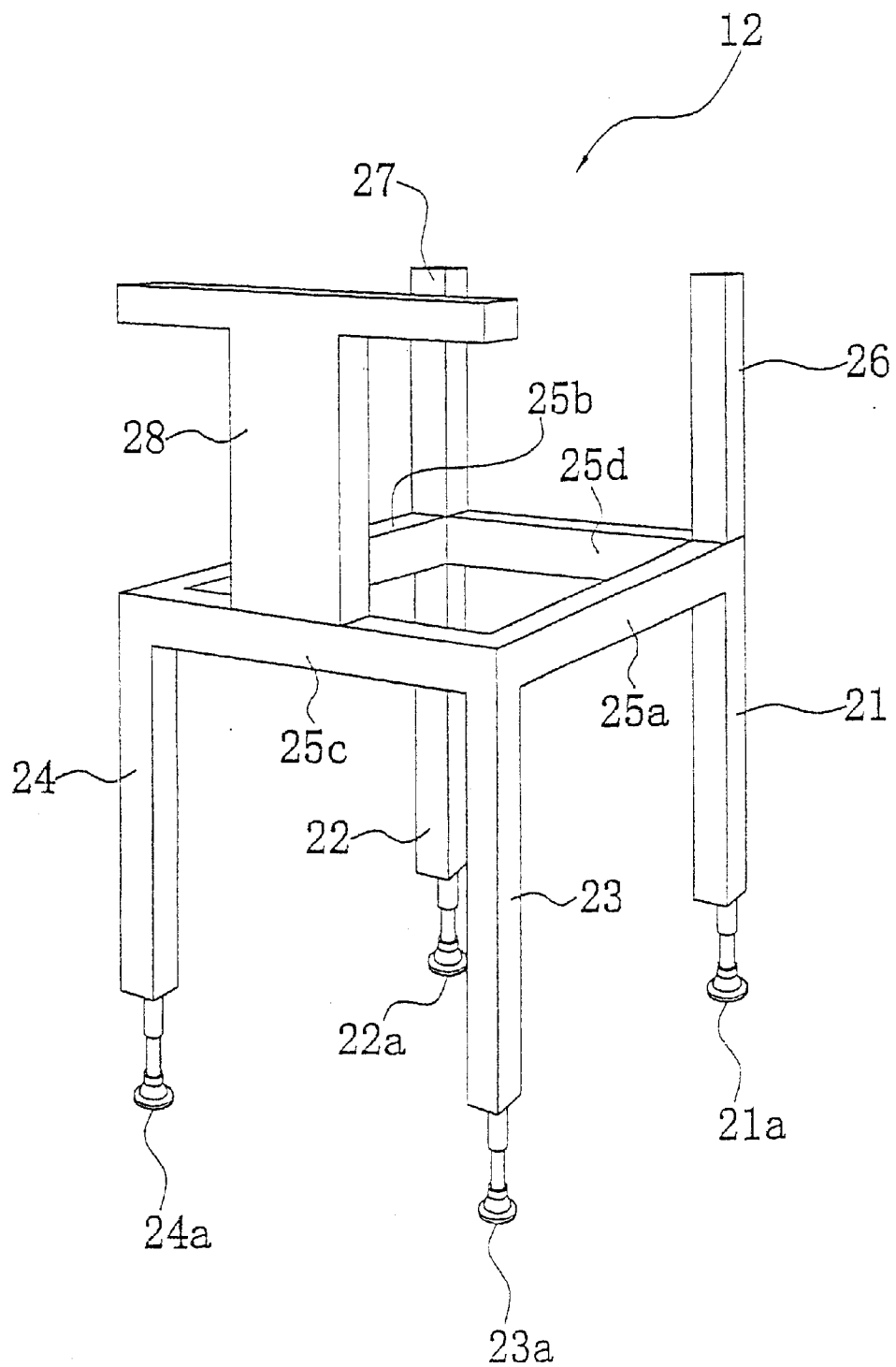
FIG. 2 is a perspective view of a support frame of the bag packaging machine depicted in FIG. 1 in accordance with the present invention shown removed from the bag packaging machine.

As shown in FIGS. 2 and 3, the support frame 12 includes four bottom pillars 21, 22, 23 and 24, horizontal beams 25a, 25b, 25c and 25d, upper pillars 26 and 27, and a large pillar 28. The bottom pillars 21, 22, 23 and 24 extend in a vertical upper direction from foot portions 21a, 22a, 23a and 24a, which contact the floor of a factory. The horizontal beams 25a, 25b, 25c and 25d connect upper ends of the bottom pillars 21, 22, 23 and 24. The upper pillars 26 and 27 further extend in a vertical upper direction from the upper ends of the bottom pillars 21 and 22. The large pillar 28 extends in a vertical upper direction from a mid portion of the horizontal beam 25c. Referring to FIG. 3, a ceiling plate 29 is fixedly coupled to upper portions of the large pillar 28 and the upper pillars 26 and 27. The ceiling plate 29 has an opening in the center thereof. The support frame 12 supports mechanisms 13, 14, 15, and 17 of the bag packaging unit 5. In this embodiment, the support frame 12 also functions as a table that supports a computerized scale 2.

As shown in FIG. 3, the forming mechanism 13 includes a tube 31 and a forming shoulder 32. The tube 31 is a tubular member with both upper and bottom ends open. The tube 31 is disposed on the center opening of the ceiling plate 29 50 as to be integrated with the forming shoulder 32 via a bracket. The bracket is not shown in figures. As each bag is formed, the bottom of the tubular film is sealed first. Then, potato chips are filled in the opening of the upper end of the tube 31 by an amount calculated by the computer scale 2. Thereafter, the top of the bag (and the bottom of the next bag) is sealed by the latitudinal seal mechanism 17. The forming shoulder 32 is disposed so as to surround the tube 31. The forming shoulder 32 is shaped such that sheet-shaped film F sent from the film supply unit 6 is formed in a tubular shape as it passes between the forming shoulder 32 and the tube 31. The forming shoulder 32 is also supported by the support frame 12 via a support member not shown in figures. Additionally, as shown in FIGS. 1 and 3, the forming mechanism 13 is disposed in a space above the space surrounded by the four bottom pillars 21, 22, 23 and 24. More specifically, the forming mechanism 13 is disposed in a space surrounded by the pillars 26, 27 and 28. The tube 31 and forming shoulder 32 can be replaced so as to fit the size of bags to be assembled and filled. When the tube 31 and/or forming shoulder 32 need to be replaced, an operator accesses the forming mechanism 13 between the large pillar 28 and the upper pillar 27, or between the large pillar 28 and the upper pillar 26. Therefore, the forming mechanism 13 is detachable with respect to the support frame 12.

The pull-down belt mechanism 14 and the longitudinal seal mechanism 15 are supported by a rail 40 that hangs from the ceiling plate 29. The pull-down belt mechanism 14 and the longitudinal seal mechanism 15 are disposed so as to hold the tube 31 therebetween. When the tube 31 is replaced, the mechanisms 14 and 15 are moved along the rail 40 until they come to the positions that are out of the way. The pull-down belt mechanism 14 directs the tubular film F that is wrapped around the tube 31 in a downward direction with assistance of a vacuum source (not shown) that acts on the film 14 thereby holding the film F against the pull-down belt mechanism 14. The pull-down belt mechanism 14 mainly includes a drive roller 41, a driven roller, and a belt (contact portion) 43 which is configured to engage the film F in response to suction from the vacuum source. The longitudinal seal mechanism 15 pushes the overlapping portions of the tubular film F against the tube 31 by a predetermined force while heating the portions, thereby sealing the tubular film F in a longitudinal direction. The longitudinal seal mechanism 15 includes a heater and a heater belt (longitudinal seal portion) which is heated by a heater and contacts the overlapping portions of the tubular film F.

As shown in FIGS. 1 and 3, the pull-down belt mechanism 14 and the longitudinal seal mechanism 15 are also disposed above a space surrounded by the four bottom pillars 21, 22, 23 and 24. More specifically, the pull-down belt mechanism 14 and the longitudinal seal mechanism 15 are in a space surrounded by the upper and large pillars 26, 27 and 28.

Latitudinal Seal Mechanism

The latitudinal seal mechanism 17 will now be described below.

Figure 4:
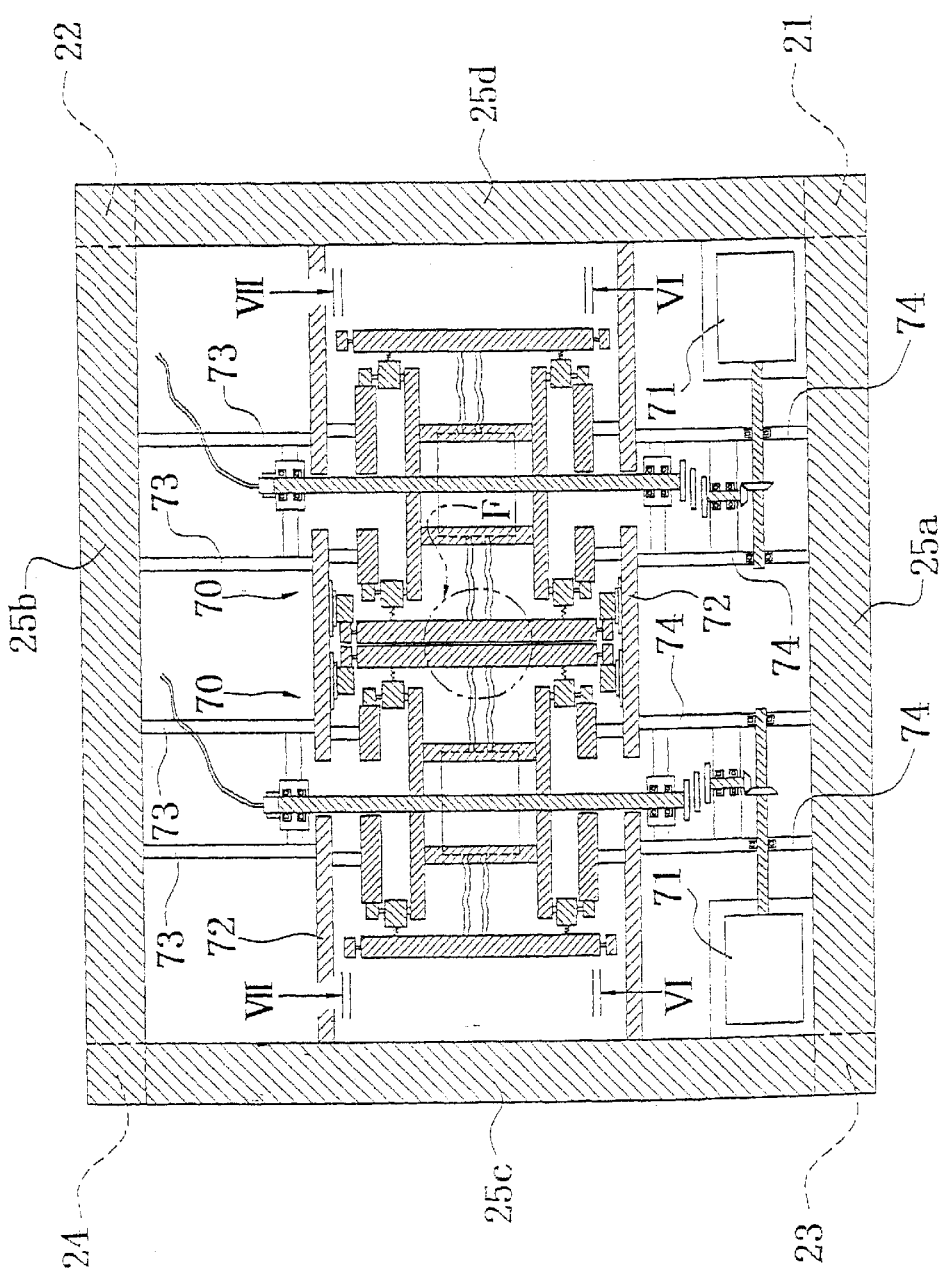
FIG. 4 is a cross-sectional view of the bag packaging unit taken along the line IV—IV in FIG. 3, in accordance with the present invention.

The latitudinal seal mechanism 17 is disposed below the forming mechanism 13, the pull-down mechanism 14, and the longitudinal seal mechanism 15. Referring to FIGS. 3 and 4, the latitudinal seal mechanism 17 is supported by the bottom pillars 21, 22, 23 and 24 and the horizontal beams 25a, 25b, 25c and 25d. As shown in FIG. 4, two support plates 72 are disposed in between the horizontal beam 25c and the horizontal beam 25d. Four support members 74 are disposed between the support plate 72 and the horizontal beam 25a. Four support members 73 are disposed between the other support plate 72 and the horizontal beam 25b.

Figure 5:
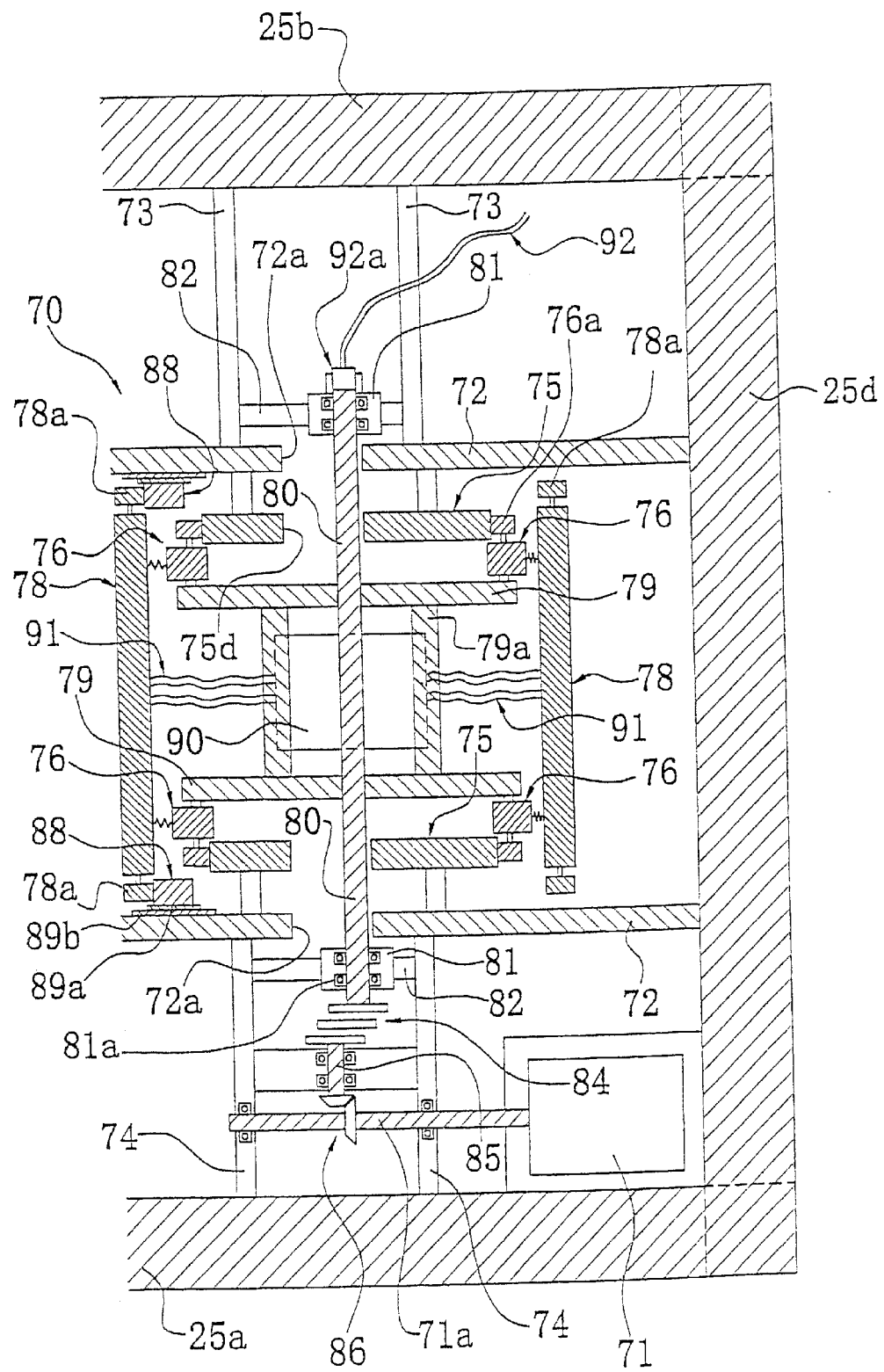
FIG. 5 is a fragmentary view of the bag packaging unit depicted in FIG. 4 as a slightly enlarged scale.

The latitudinal seal mechanism 17 includes a pair of mechanisms 70 that are symmetrically disposed between the beams 25c and 25d. FIG. 5 is an enlarged view of the mechanism 70 disposed closer to the horizontal beam 25d. Although following description pertains to the mechanism 70 on the horizontal beam 25d side, the mechanism 70 on the horizontal beam 25c side has a generally identical mirror image structure.

Figure 6:
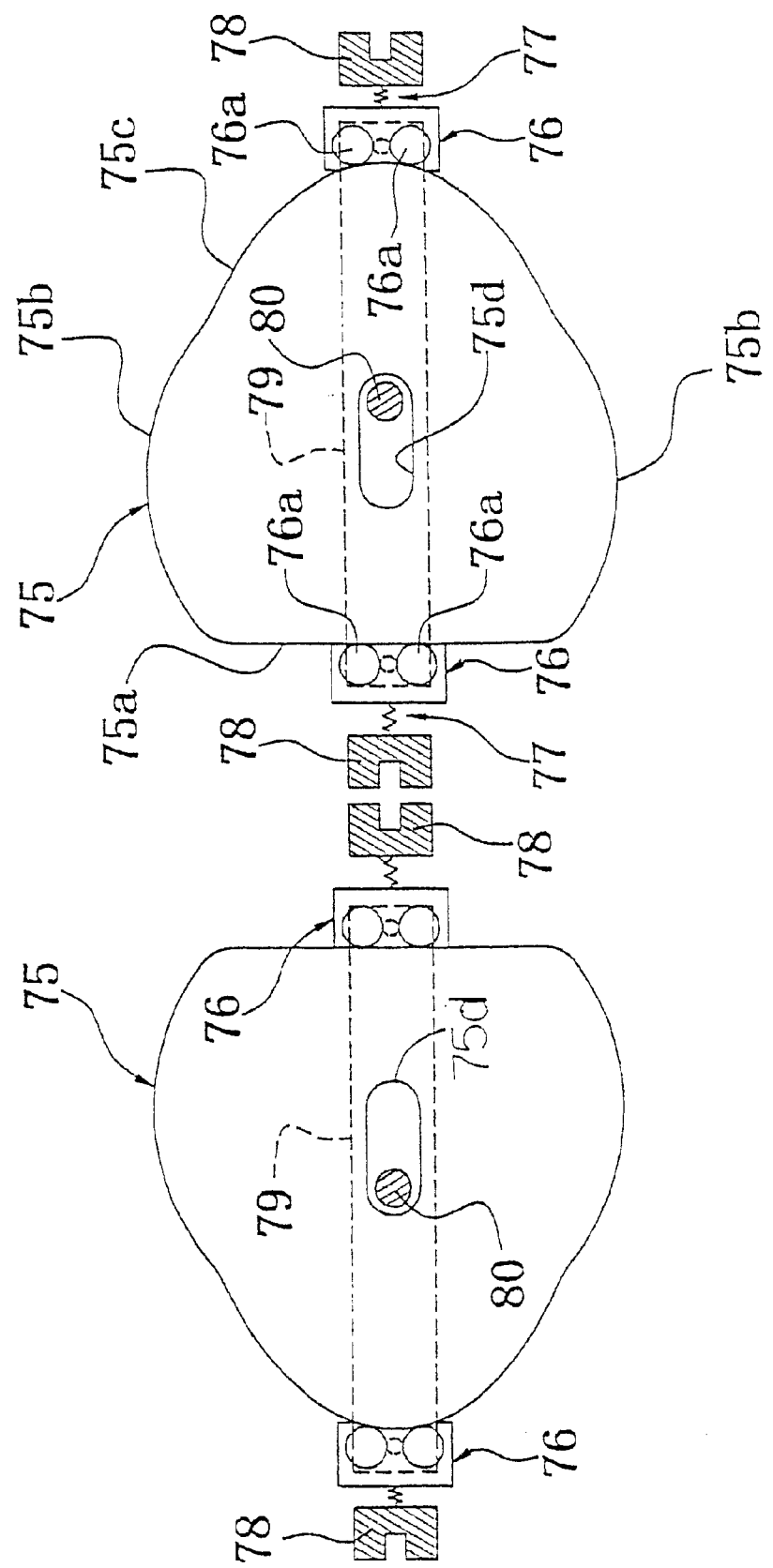
FIG. 6 is a cross-sectional view of a portion the bag packaging unit taken along the line VI—VI in FIG. 4 in accordance with the present invention.
Figure 7:
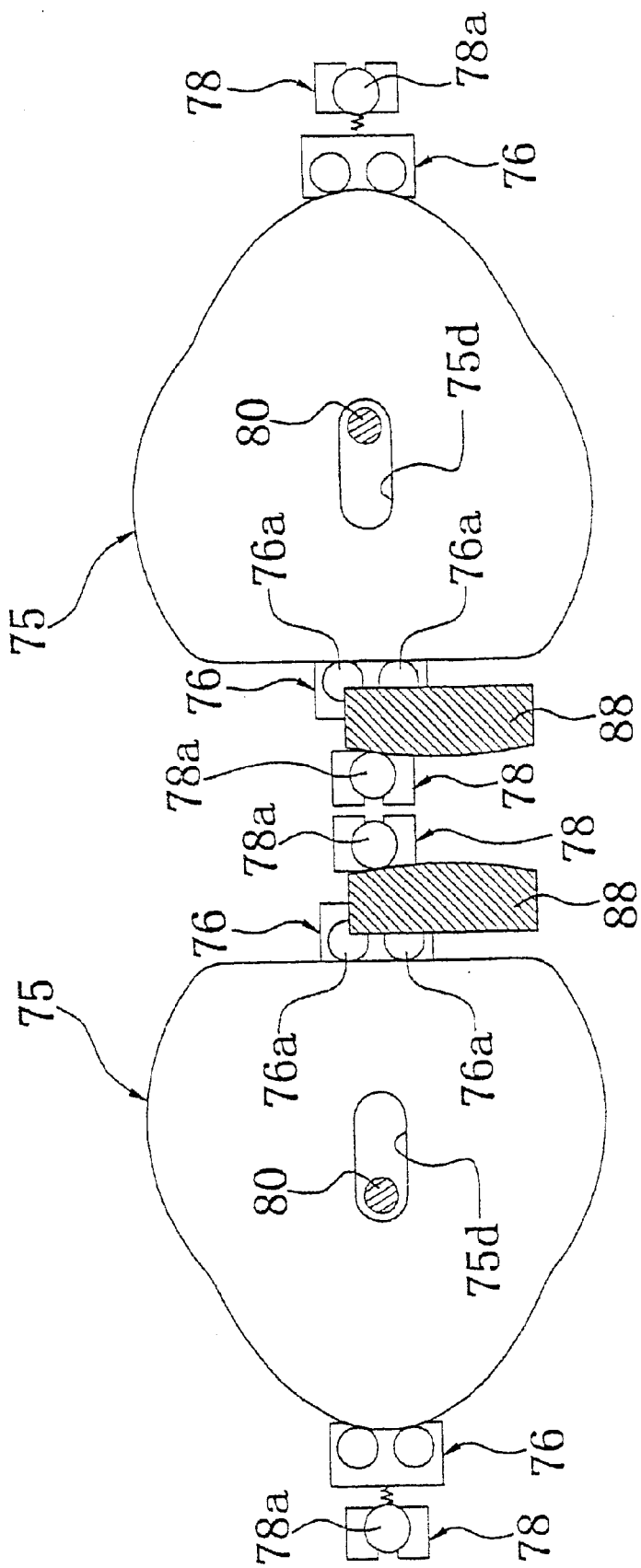
FIG. 7 is a cross-sectional view of the bag packaging unit taken along the line VII—VII in FIG. 4 in accordance with the present invention.

The mechanism 70 is configured to rotate two seal jaws 78 about a cam (described below) such that the seal jaws 78 moves in a path having the shapes of the letter D. The mechanism 70 pushes the seal jaw 78 against the seal jaw 78 of the other mechanism 70 to seal the tubular film in the latitudinal direction. As shown in FIGS. 5, 6 and 7, the mechanism 70 includes fixed cams 75, cam followers 76, a rotational shaft 80, coupling members 79, seal jaws 78, partial cam followers 78a, partial cams 88, and a motor 71.

The fixed cams 75 are disposed in a space between the two support plates 72. The fixed cams 75 are fixed to the support plates 72. As shown in FIG. 6, the fixed cams 75 have a shape that is substantially the shape of the letter D. Each of the fixed cams 75 has at its center an elongated bore 75d that is elongated in the direction of the horizontal beams 25a and 25b. Referring to FIG. 6, the fixed cam 75 includes a flat surface 75a that faces the fixed cam 75 of the other mechanism 70. The upper and bottom surfaces of the fixed cam 75 form arc surfaces 75b. The surface opposite the flat surface 75a forms a curved surface 75c.

Each fixed cam 75 engages two cam followers 76. The cam followers 76 are rotatably supported at opposite ends of the coupling member 79. Therefore, the distance between the two pairs of respective cam followers 76 remains constant. Each cam follower 76 has two rollers 76a that rotate while in contact with the peripheral surface of the fixed cam 75.

Figure 10:
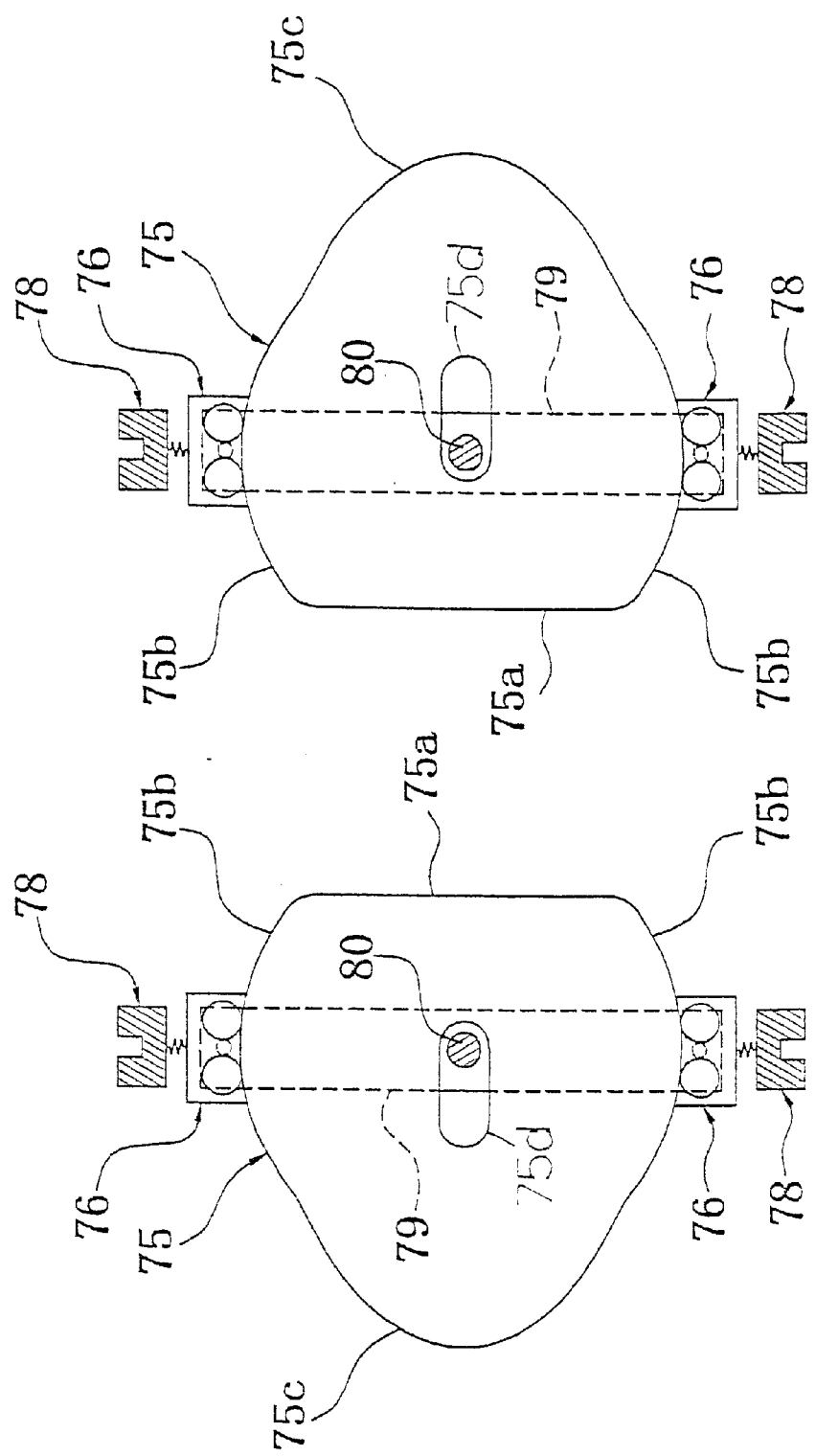
FIG. 10 is a view of the seal jaw being in a status where the cam followers are on the arc surfaces of the fixed cams.

Referring to FIG. 5, the rotational shaft 80 extends through the openings 72a formed on the support plates 72 and the elongated bores 75d formed on the fixed cams 75. The rotational shaft 80 is pivotally supported by the bearings 81a which are disposed outside the space formed between the support plates 72. As shown in FIG. 5, the bearings 81a are fixed to the sliders 81. The sliders 81 slide along rails 82. Ends of respective ones of the rails 82 are fixed to respective support members 73 or 74. In this manner, bearings 81a move in the direction of the horizontal beams 25a and 25b. In other words, the rotational shaft 80 is supported so as to be movable in the direction of the horizontal beams 25a and 25b. The rotational shaft 80 extends through a portion of an elongated bore 75d formed in a respective one of the fixed cams 75 closest to the other mechanism 70 (hereinafter referred to as "inner side") as shown in FIG. 10, and further the rotational shaft is movable within the elongated bore 75d to a position farthest from the other mechanism 70 (hereinafter referred to as "outer side") as shown in FIG. 6. Additionally, the sliders 81 have ball bearings or cylinders that roll on the rails 82. In this manner, the sliders 81 can slide against the rails 82 with little, if any, frictional resistance.

Referring to FIG. 5, the rotational shaft 80 engages a shaft 85 via a Schmidt coupling 84 therebetween. The shaft 85 engages a rotational shaft 71a of the motor 71 via a bevel gear 86. The Schmidt coupling 84 is a shaft coupler having three disks that are linked together for axially transmitting rotation of an input shaft, the shaft 85, to an output shaft, the rotational shaft 80. The Schmidt coupling 84 can transmit rotation of the shaft 85 even when the rotational shaft 80 moves relative to the shaft 85 in a direction perpendicular to the rotational shaft 80, and therefore the distance between the two shafts changes. Consequently, the rotational shaft 80 rotates as the motor 71 rotates. The motor 71 is supported by the horizontal beams 25a and 25d, while the rotational shaft 71a of the motor 71 is supported by bearings fixed to the support members 74. The motor 71 is a servomotor that is adapted to control rotational speed and/or torque.

The centers of the coupling members 79 are fixed to the rotational shaft 80. Accordingly, the coupling members 79 rotate according to rotation of the rotational shaft 80. As described above, the cam followers 76 are coupled to both ends of the coupling members 79. Accordingly, as shown in FIG. 6 and other figures, each pairs of cam followers 76 are disposed on opposite sides of the mechanism 70 with respect to the rotational shaft 80. Changes in the distances between each pair of the cam followers 76 and the rotational shaft 80 are the same during rotation.

Figure 12:
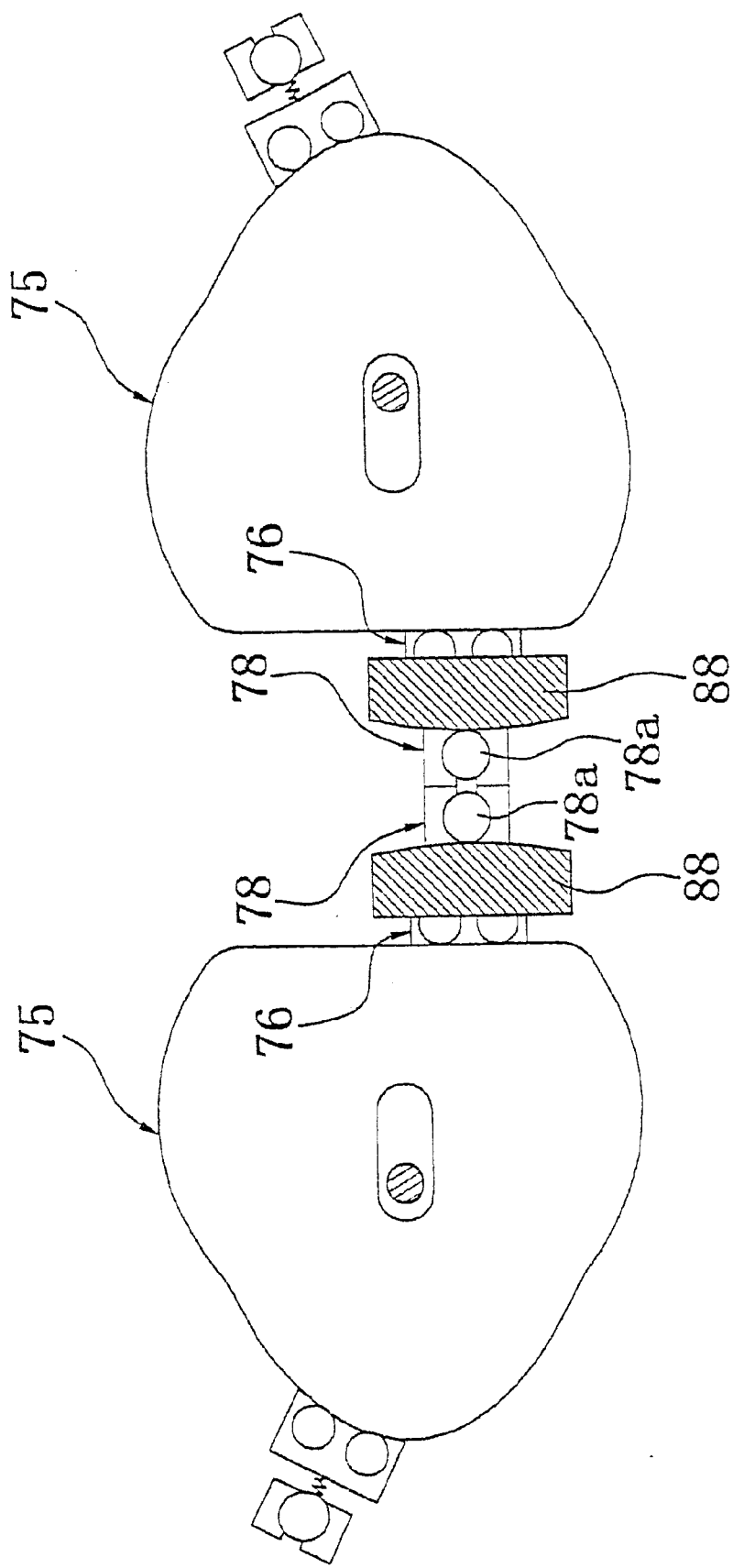
FIG. 12 is a view of the seal jaws of the bag packaging machine with the cam followers in full contact with the flat surfaces of the fixed cams.

Referring to FIGS. 5 and 6, the seal jaws 78 extend in the direction of the horizontal beams 25c and 25d. The seal jaws 78 are supported by the cam followers 76 via plate springs 77 at two different positions. The plate spring 77 is capable of a few millimeters of compression. As will be described below, the plate springs 77 extend when the partial cam 88 engages the partial cam follower 78a, and thereafter pulls the jaws 78 to restore the relative distance between the cam follower 76 and the seal jaws 78. There are two partial cam followers 78a on each seal jaw 78, one partial cam follower 78a disposed at each opposite end of the two seal jaws 78, and are supported by the seal jaws 78. As shown in FIGS. 7 and 12, the partial cam followers 78a rotate contacting an inner side surface of the partial cams 88 when the cam followers 76 pass adjacent to the partial cams 88.

Figure 8:
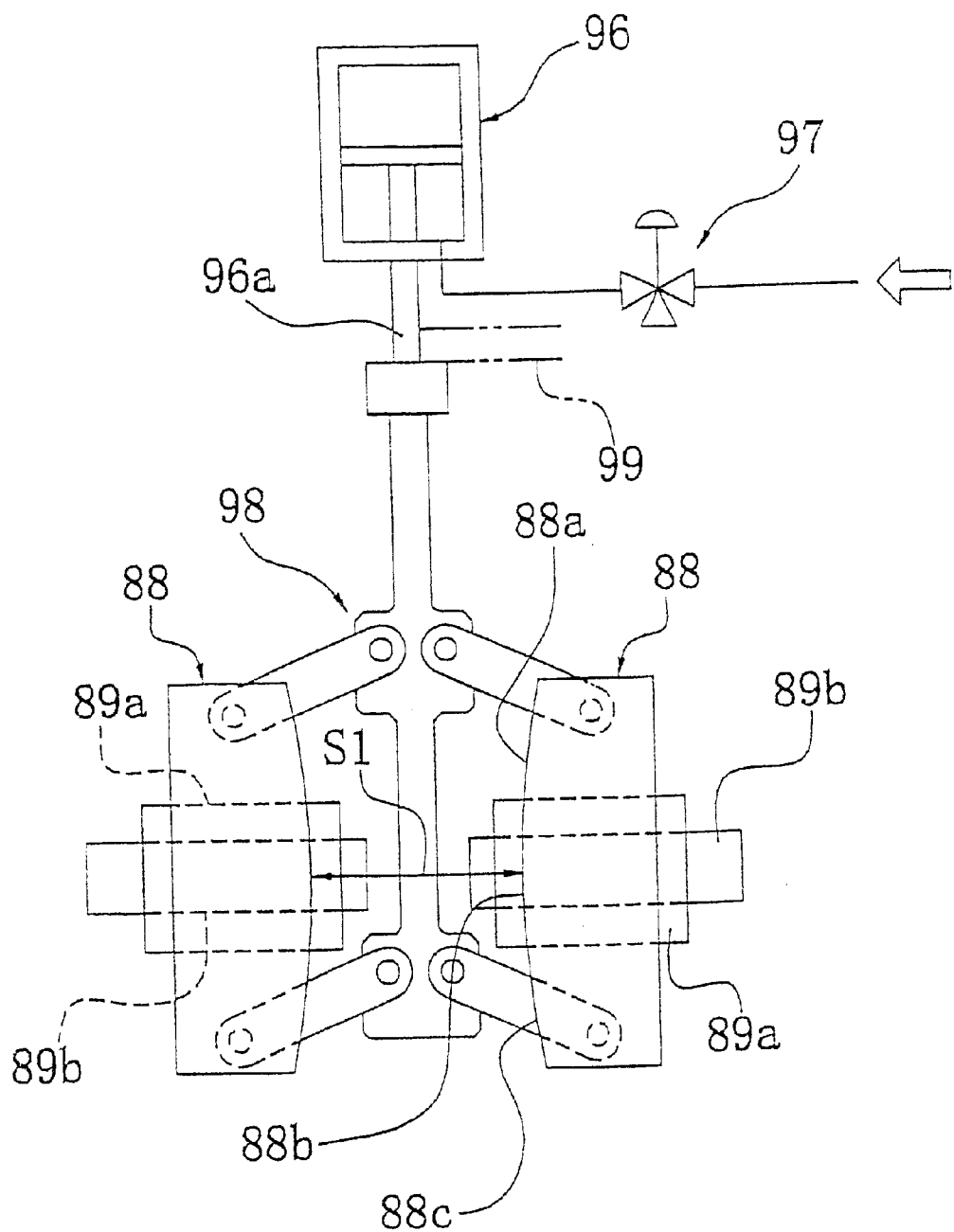
FIG. 8 is a schematic view of a latitudinal seal pressure generation mechanism using partial cams for use with the bag packaging machine in accordance with the present invention.
Figure 13:
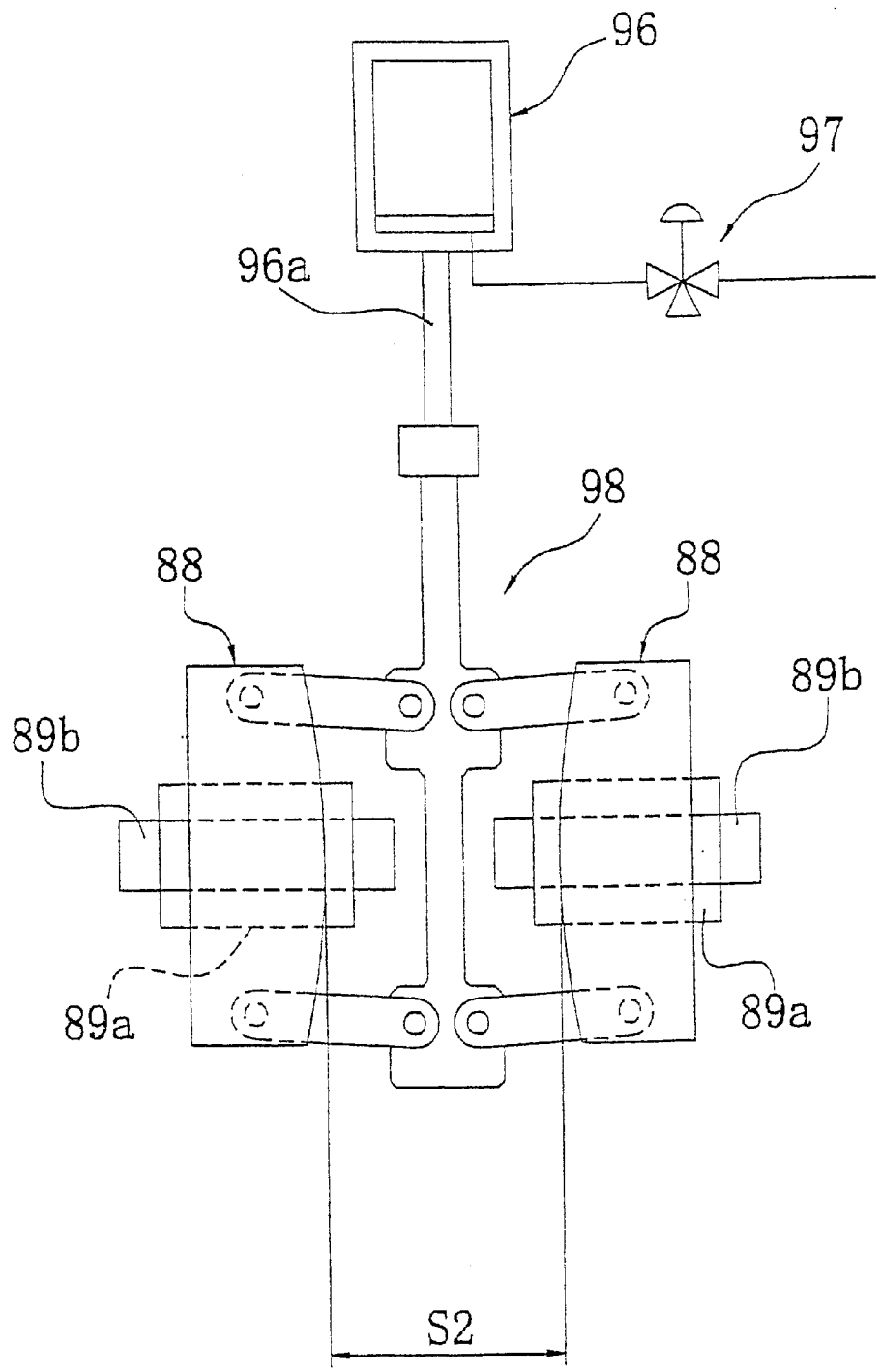
FIG. 13 is a view of the latitudinal seal pressure generation mechanism depicted in FIG. 8 in accordance with the present invention.

Each partial cam 88 is supported by the support plate 72 via a slider 89a and a rail 89b as shown in FIGS. 8 and 13. One partial cam 88 is fixed to a corresponding slider 89a, whereas the rail 89b is fixed to the support plate 72. The slider 89a engages the rail 89b, so as to slide along the rail 89b in the direction of the horizontal beams 25a and 25b while being supported by the rail 89b.

Referring to FIG. 8, the inner side surface of the partial cam 88 includes an entrance surface 88a, a pressure surface 88b, and an exit surface 88c. As shown in FIG. 7, when the partial cam follower 78a engages the entrance surface 88a, opposing seal jaws 78 face each other with a gap therebetween as shown in FIGS. 4 and 6. The pressure surface 88b is formed immediately below the entrance surface 88a. As shown in FIG. 12, when the partial cam follower 78a engages the pressure surface 88b, the opposing seal jaws 78 are urged against each other. The exit surface 88c (FIG. 8) is formed immediately below the pressure surface 88b. When the partial cam follower 78a engages the exit surface 88c, the seal jaws 78 again face each other with a gap therebetween.

Referring to FIG. 8, the partial cam 88 and the partial cam 88 of the other mechanism 70 are coupled to each other via a link mechanism 98. The positions of the partial cams 88 are determined by an air cylinder 96 that activates the link mechanism 98. As shown in FIG. 8, when the air cylinder 96 is connected with a high-pressure air supply, which is not shown in figures, via an electromagnetic three-way valve 97, the piston of the cylinder 96 is pulled up until it hits a stopper 99. When the piston hits the stopper 99, the partial cams 88 are closest to each other. At this point, the partial cam followers 78a engage the pressure surfaces 88b, and the seal jaws 78 are forced against each other (FIG. 12). The seal jaws 78 press against each other due to pressure from the partial cams 88. In other words, the partial cams 88 receive reaction force to move away from each other, from the seal jaws 78 via the cam followers 78a. However, the air cylinder 96 prevents the partial cams 88 on both sides from moving away.

The latitudinal seal mechanism 17 includes therein a cutter device (not shown) that severs a bag from a following bag by cutting the middle of the portion sealed by the seal jaws 78.

Heat Control of Latitudinal Seal Mechanism

Figure 9:
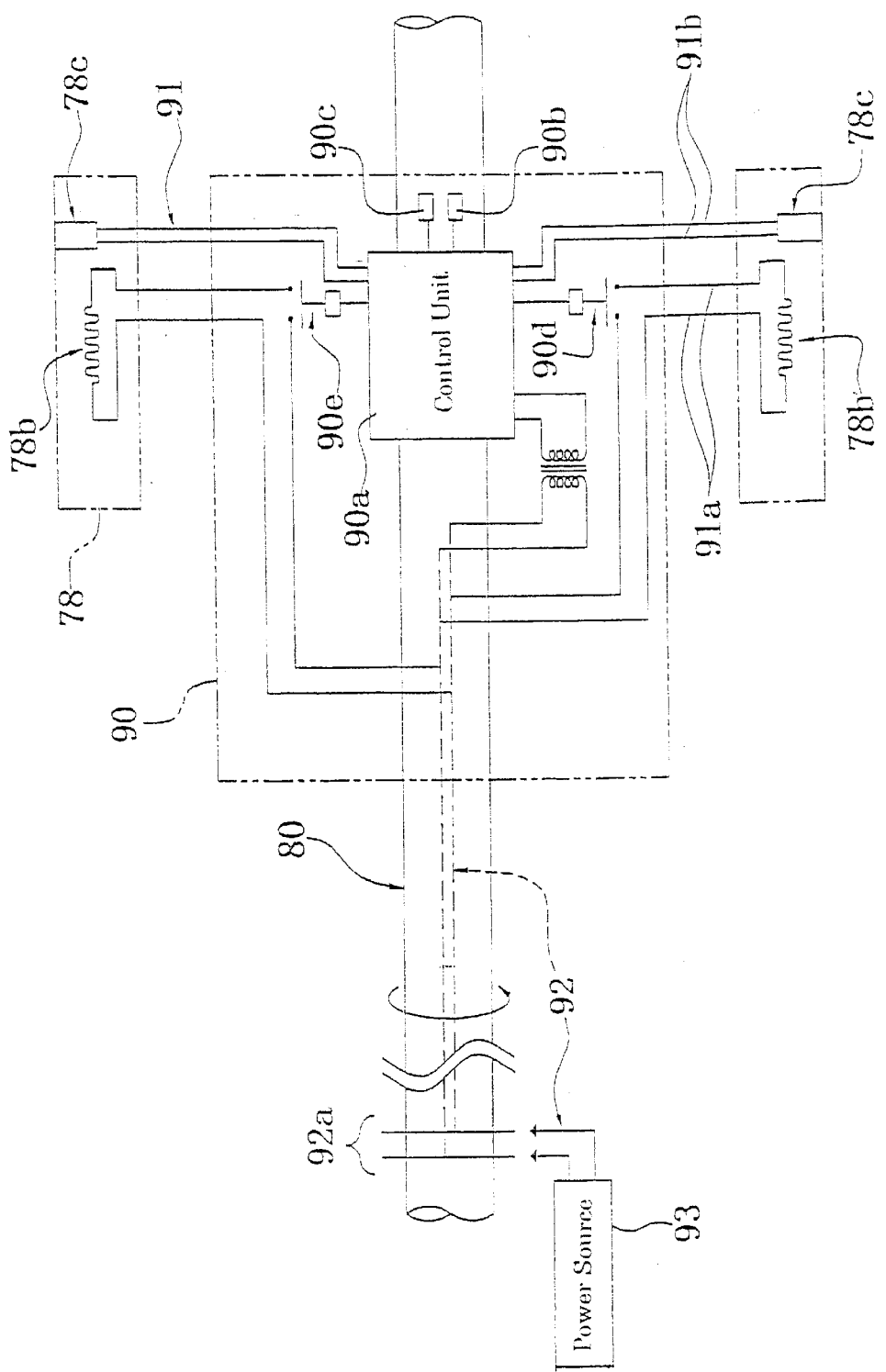
FIG. 9 is a schematic view of a heating control system for use in the bag packaging machine in accordance with present invention.

The latitudinal seal mechanism 17 crimps portions of tubular film in a latitudinal direction by holding tubular films between the seal jaws 78. To seal, the seal jaws 78 need to apply both pressure and heat. To heat contacting surfaces (heated portion) of the seal jaws 78, which contact the tubular film, each seal jaw 78 includes heaters 78b (heating means) therein (FIG. 9). Also, each seal jaw 78 includes thermocouples 78c to monitor whether or not the temperature of the contacting surfaces of the seal jaws 78 is adequate.

A control unit 90 (FIG. 9) that rotates with the rotational shaft 80 includes a controller 90a. The controller 90a monitors the temperature by the thermo couples 78c, and controls ON/OFF of the heaters 78b. As shown in FIG. 5, the control unit 90 is fixed to the support members 79a. The support members 79a connect the coupling members 79 that are fixed to the rotational shaft 80. The control unit 90 includes, apart from the controller 90a, memories 90b and 90c and switches 90d and 90e (FIG. 9). The memories 90b and 90c store configured temperature for each heater 78b. The switches 90d and 90e control ON/OFF of power supply to each heater 78b. Referring to FIGS. 5 and 9, power supply lines 91a and compensating lead wires 91b extend from the control unit 90 to each of the seal jaws 78. The power supply lines 91a supply power to the heaters 78b. The compensating lead wires 91b connect the thermo couples 78c and the controller 90b.

Power is supplied to the controller 90a and each heater 78b from an external power source 93 through electricity distribution lines 92 that include a slip ring 92a. The slip ring 92 is utilized because the external power source 93 does not rotate. Power is first supplied the power distribution lines 92 that are inside the rotational shaft 80, which does rotate. The power is supplied to the control unit 90, to be distributed to the controller and each heater 78b therefrom. As shown in FIG. 5, the slip ring 92a is coupled to an end of the rotational shaft 80 that is closer to the horizontal beam 25b.

The controller 90a controls power supply to each heater 78b by switching ON/OFF of the switches 90d and 90e. The heaters 78b do not need to be kept on at all times during operation of the bag packaging machine 1. Instead, the heaters 78b need to be on only enough to warm a contacting surface of a seal jaw 78 of which the temperature has decreased. Therefore, the controller 90a of the control unit 90 controls such that the sum of power supplied to each heater 78b does not exceed a predetermined amount, by not turning the switches 90d and 90e ON at the same time. In other words, the controller 90a assigns time period to each heater 78b, during which power is supplied to the heater 78b.

Operation of Bag Packaging Machine

Operation of the bag packaging machine is explained below.

Sheet-shaped film F is sent from the film supply unit 6 to the forming mechanism 13, and then formed into a tubular shape as the film F passes the forming shoulder 23 and is wrapped about the tube 31. Then, the film F is conveyed in a downward direction by the pull-down belt mechanism 14. The film F stays wrapped about the tube 31, with both ends overlapping each other on the periphery of the tube 31. The longitudinal seal mechanism 15 seals the overlapping portions in a longitudinal direction.

Once sealed, the tubular film F now has a tubular shape. The film F passes the tube 31, and is further sent down to the latitudinal seal mechanism 17. The position of the film F at this stage is depicted in a two-dot chain line in FIG. 4. At this stage, as the tubular film F moves, a predetermined amount of potato chips are supplied from the computed scale 2 via the tube 31. At the latitudinal seal mechanism 17, the top and bottom ends of a bag are sealed in the latitudinal direction with potato chips filled in the tubular film F.

Operation of Latitudinal Sealing of the Bag Packaging Machine

Operation of latitudinal sealing will now be explained.

Figure 11:
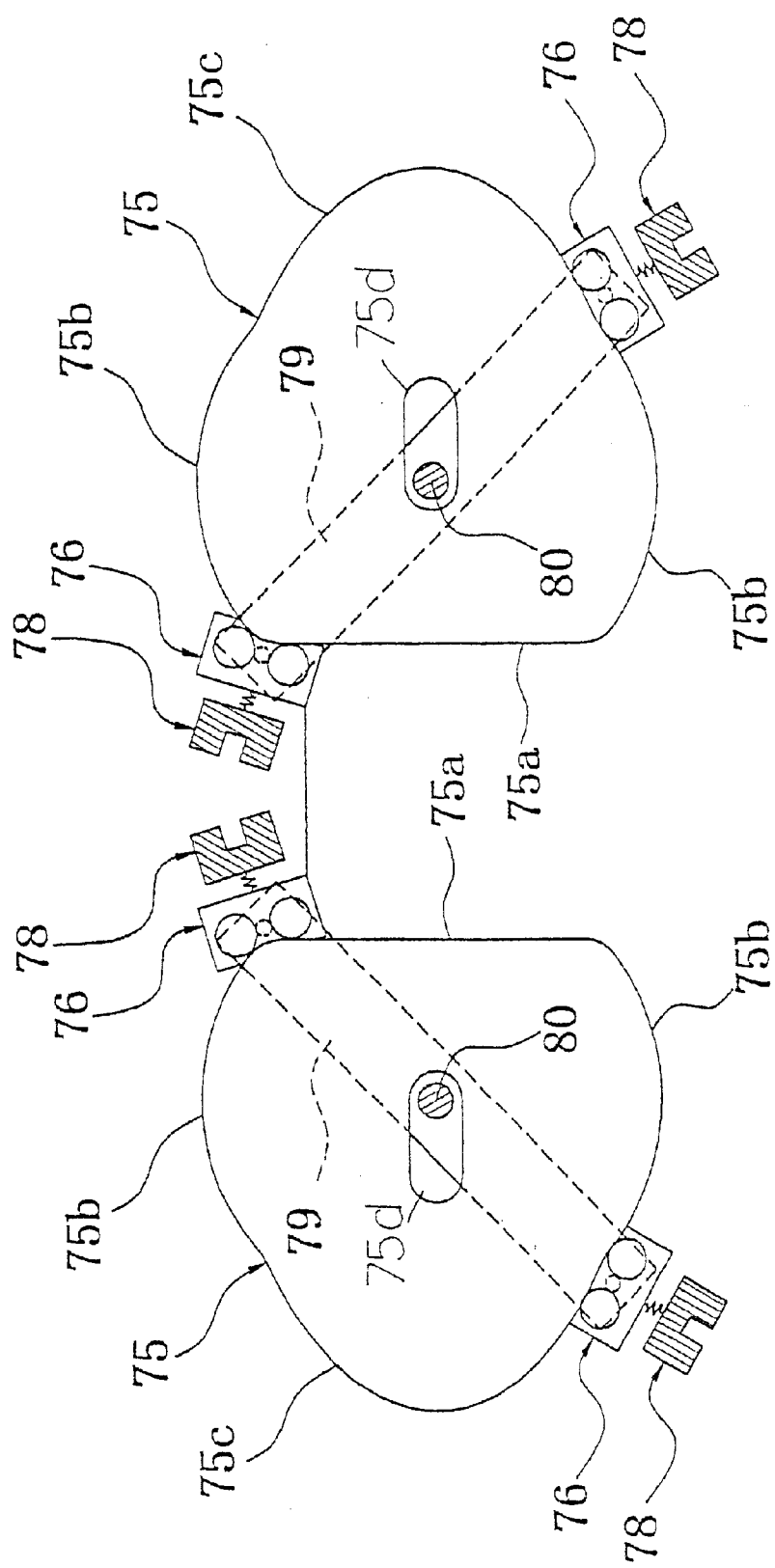
FIG. 11 is a view of seal jaws of the bag packaging machine shown with the cam followers beginning to contact flat surfaces of the fixed cams.
Figure 14:
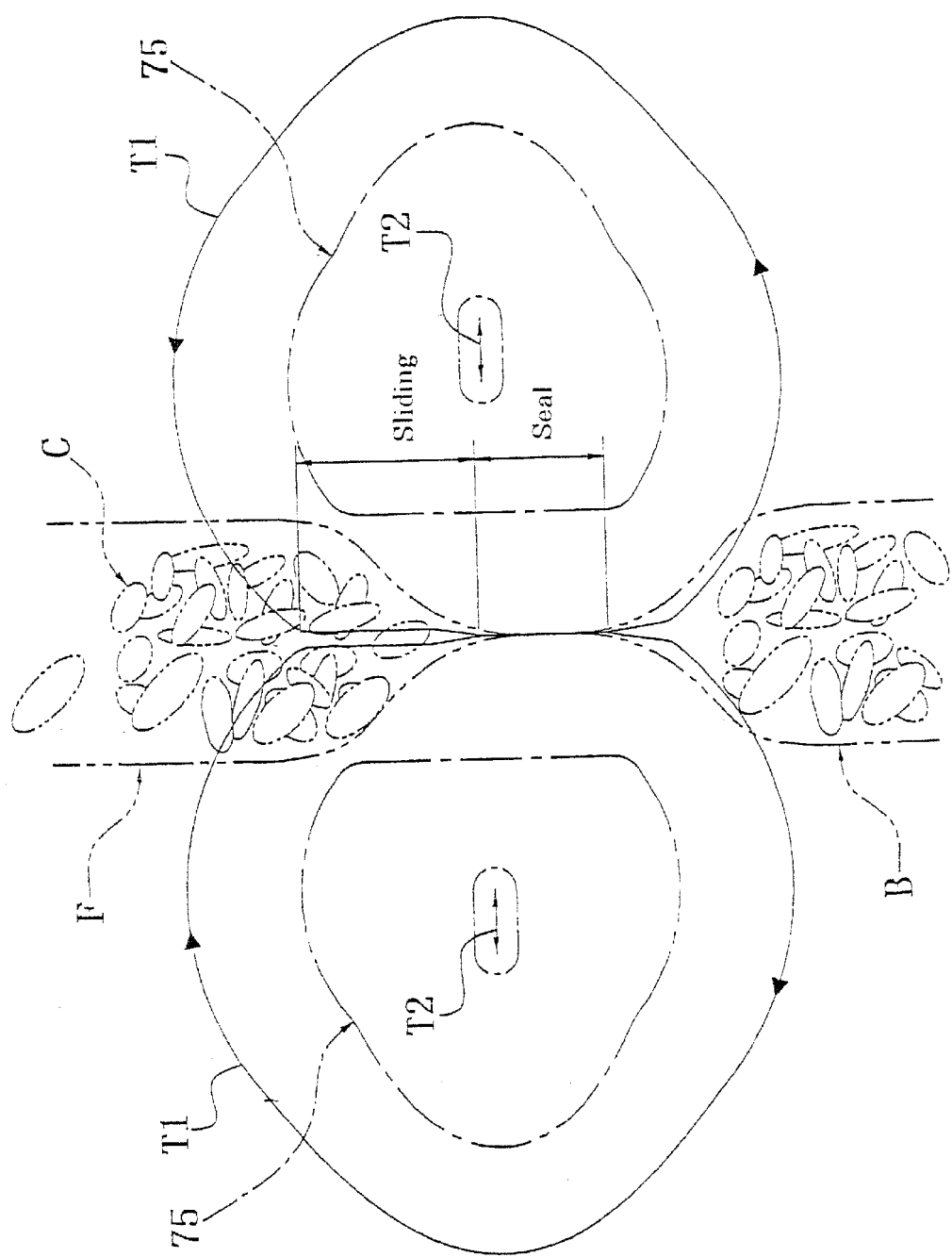
FIG. 14 is a view showing rotational locuses of the seal jaws and the locuses of the rotational shafts about the fixed cams.

In the latitudinal seal mechanism 17, rotation of the motor 71 moves the cam follower 76 and the seal jaw 78 in a circular manner about the rotational shaft 80. Since the cam follower 76 is coupled to each end of the coupling member 79, the two cam followers 76 effectively hold the fixed cam 75 therebetween. Accordingly, the rollers 76a of the cam followers 76 move along the periphery of the fixed cam 75. Then, the rotational shaft 80 moves horizontally as shown in FIGS. 6, 10, and 11. More specifically, when the rollers 76a of the cam follower 76 are on the arc surfaces 75b as shown in FIG. 10, the rotational shaft 80 is on the inner side of the elongated bore 75d. As the latitudinal seal mechanism 17 shifts from a status shown in FIG. 11 to a status shown in FIG. 6, in other words, as rollers 76a of one cam follower 76 move on the flat surface 75a and rollers 76a of the other cam follower 76 move on the curved surface 75c, the rotational shaft 80 moves between the inner side and the outer side within the elongated bore 75d. In this manner, the rotational shaft 80 repeats stopping at the inner side of the elongated bore 75d and moving linearly back and forth between the inner side and the outer side of the elongated bore 75d. FIG. 14 shows a locus T2 of the rotational shaft 80.

The cam followers 76 rotate along the periphery of the fixed cam 75, drawing a locus in the shape of letter D, as described above. The seal jaws 78 also rotate following the cam followers 76. In addition, the seal jaws 78 rotate relative to the cam follower 76 when they are in the area near the partial cam 88. As the inner cam follower 76 moves into the flat surface 75a, in other words from a status shown in FIG. 11 to a status shown in FIG. 6, a partial cam follower 78a at an end of the seal jaw 78 engages an inner side surface (entrance surface 88a) of the partial cam 88, as shown in FIG. 7. Thereafter, the cam follower 76 keeps moving while contacting the fixed cam 75. The seal jaw 78 moves downward while moving horizontally away from the cam follower 76 (FIG. 12). At this time, the plate spring 77 that couples the cam follower 76 and the seal jaw 78 is extended. Accordingly, the seal jaw 78 and the corresponding seal jaw 78 of the other mechanism push against each other. Further, as the partial cam follower 78a moves from the pressure surface 88b to the exit surface 88c, the seal jaws 78 separate from each other. FIG. 14 shows rotational locuses T1 of the seal jaws 78, including the locus in the area near the partial cam 88. Specifically, the rotational locus T1 is a locus of an end of the seal jaw 78, in other words, a contacting surface of the seal jaw 78 that contacts the tubular film F.

In this manner, in the latitudinal seal mechanism 17, the seal jaw 78 of one mechanism 70 rotates drawing a locus in the shape of letter D, whereas the seal jaw 78 of the other mechanism 70 rotates drawing a locus in the shape of inverted letter D. In the process of rotation, the seal jaws 78 of the two mechanisms 70 push against each other. (See rotational locuses T1 of the seal jaws 78 in FIG. 14)

As a film F is passed down to the middle portion of the latitudinal seal mechanism 17, a portion of the tubular film F undergoes sliding contact with the seal jaws 78 in the area of the latitudinal seal mechanism 17 shown as "Sliding" in FIG. 14. In this process, the seal jaws 78 move downward at a speed a few times faster than a conveyance speed of the tubular film F, with the contacting surfaces of the seal jaws 78 being kept a few millimeters apart with the tubular film F therebetween. In this manner, potato chips C in the portion of the tubular film F to be sealed are pushed downward such that potato chips C are not sealed with the tubular film F at the time of sealing.

Next, as the seal jaws 78 move through the "Seal" area shown in FIG. 14, an upper portion of a bag B and a bottom portion of a following bag are sealed at the same time. At this process, the seal jaws 78 move basically at the speed of conveyance of the tubular film F (now a bag). As the tubular film F is sealed, the cutter device disposed in the seal jaws 78 separates a bag B from the tubular film F.

In this manner, bags B are manufactured continuously, and delivered to a belt conveyer (not shown in figures) by an inclined delivery plate 19. The belt conveyer thereafter delivers the bags B to devices that conduct other processes such as weight checkers.

Features of the Bag Packaging Machine (1) In the bag packaging machine 1, the latitudinal seal mechanism 17 is supported by the support frame 12 on both sides, unlike a conventional bag packaging machine which is supported in a cantilever manner. The support frame 12 includes the foot portions 21a, 22a, 23a and 24a that are disposed so as to surround the latitudinal seal mechanism 17. The support frame 12 also includes four bottom pillars 21, 22, 23 and 24 that extend in a vertical upper direction from the foot portions 21a, 22a, 23a and 24a. Therefore, the support frame 12 can securely support the latitudinal seal mechanism 17. Accordingly, the latitudinal seal mechanism 17 does not rattle even when bag packaging process has been conducted at a high speed. Notably, the latitudinal seal mechanism 17 of the present embodiment rotates the seal jaws 78 in the shape of letter D. Rotation of seal jaw generally leads to greater rattling because of the weight and momentum of the seal jaw. However, since the latitudinal seal mechanism 17 is supported on both ends in this embodiment, the bag packaging machine of the present invention can keep rattling below an allowable level even at the time of high-speed processing.

Also, the latitudinal seal mechanism 17 is disposed within the support frame 12, which includes four bottom pillars 21, 22, 23 and 24 and horizontal beams 25a, 25b, 25c and 25 that connect upper ends of the bottom pillars 21, 22, and 24. Therefore, the latitudinal seal mechanism 17 is supported on front, back, left, and right sides. Accordingly, it is not likely that the latitudinal seal mechanism 17 will be displaced due to rattling.

Although the latitudinal seal mechanism 17 is disposed within the support frame 12, with the seal jaws being within a space surrounded by the four bottom pillars 21, 22, 23 and 24 in this embodiment, the latitudinal seal mechanism 17 does not necessarily need to be within the support frame 12. The latitudinal seal mechanism 17 can be partially outside the space surrounded by the four bottom pillars 21, 22, 23 and 24, including the space thereabove.

(2) In the bag packaging machine 1 of the present embodiment, the forming mechanism 13, the pull-down belt mechanism 14, and the longitudinal seal mechanism 15 are also supported by the support frame 12 and disposed within a space above the space surrounded by the four bottom pillars 21, 22, 23 and 24. The forming mechanism 13, the pull down belt mechanism 14, and the longitudinal seal mechanism 15 form a film in a tubular shape, deliver the film, and apply longitudinal seal process thereto in a continuous manner. Therefore, there is little rattling due to the belt 43 of the pull down belt mechanism 14 and the heater belt of the longitudinal seal mechanism 15.

Further, as shown in FIGS. 1 and 3, the tube 31 of the forming mechanism 13 is disposed such that the tube 31 is in the center of the support frame 12 when viewed from above. Since the tube 31 is disposed above the space surrounded by the foot portions 21a, 22a, 23a and 24a and the bottom pillars 21, 22, 23 and 24, the support frame 12 can also function as a table for supporting the computer scale 2. Therefore, no additional table for supporting the computer scale 2 is required above the bag packaging unit 5. Also, the bag packaging machine 1 and the computer scale 2 can be coordinated in an orderly manner.

(3) In the latitudinal seal mechanism 17 of the bag packaging machine 1 of the present invention, the rotational shafts 80 slides against the fixed cams 75, unlike a conventional latitudinal seal mechanism where the cam followers 76 and the coupling members 79 slide against each other. Therefore, the slide mechanism (the slider 81 and the rail 82) can be formed outside the space surrounded by the fixed cams 75, where there is more space. Accordingly, the latitudinal seal mechanism 17 is more durable. In addition, the latitudinal seal mechanism 17 of the present embodiment has two cam followers 76 for each fixed cam 75. If the latitudinal seal mechanism 17 had a structure where the cam followers 76 slide against the coupling members 79, one mechanism 70 would require four slide mechanisms. However, since the latitudinal seal mechanism 17 of the present embodiment has a structure where it is the rotational shafts 80 that slides, there only need to be two slide mechanisms for each mechanism 70.

(4) The latitudinal seal mechanism 17 of the bag packaging machine 1 of the present embodiment has two cam followers 76 for each fixed cam 75. Therefore, the latitudinal seal mechanism 17 can seal latitudinally twice per one rotation of the rotational shaft 80.

When viewed from side, the cam followers 76 are disposed so as to hold the rotational shaft 80 therebetween, with the coupling member 79 connecting all of them. This is why the latitudinal seal mechanism 17 of the present invention can utilize a plate cam that engages only inner side of the roller 76a of the cam follower 76, instead of a groove cam that engages both inner and outer sides of the rollers 76a of the cam follower 76. In other words, since the cam followers 76 hold the fixed cam 75 therebetween, the cam followers 76 do not disengage the fixed cam 75, even if the fixed cam 75 is a plate cam.

(5) In the latitudinal seal mechanism 17 of the bag packaging machine of the present invention, partial cam followers 78a are disposed on both ends of the seal jaws 78. The latitudinal seal mechanism 17 also includes a pair of partial cams 88 that engages the seal jaws 78 and the tubular film F when the tubular film F is held between the opposing seal jaws 78. The latitudinal seal mechanism 17 also includes a link mechanism 98 and an air cylinder 96 (See FIG. 8) that apply force to the pair of partial cams 88. In this manner, the seal jaws 78 are pressed against each other only at the time of sealing. Also, the pressing force is generated by the air cylinder 96, instead of the motor 71. Therefore, there is no need for a motor that generates torque that is large enough to oppose the sealing pressure, whereby cost is reduced.

Also in this embodiment, the force by which the seal jaws 78 hold a portion of the tubular film F to be sealed, in other words the sealing pressure, can be controlled by adjusting the electromagnetic three-way valve 97, which controls the pressure inside the air cylinder 96.

Additionally, the air cylinder 96 applies force in a perpendicular direction (vertical direction) relative to the direction of seal pressure (horizontal direction) through the link mechanism 98. The link mechanism 98 also connects the partial cams 99. Therefore, a greater seal pressure can be generated with a small air pressure.

Furthermore, by disconnecting the connection between the high pressure air supply and the air cylinder through operation of the electromagnetic three-way valve 97, the gap between the partial cams 88 is enlarged from S1 (FIG. 8) to S2 (FIG. 13). In this manner, if bags should not be sealed latitudinally, for instance when the quality of potato chips is not ensured, low quality potato chips can be thrown away before sealing the bags.

Although the present embodiment utilizes the air cylinder 96, other means such as an oil pressure cylinder can also be utilized.

(6) The partial cam 88 of the latitudinal seal mechanism 17 of the bag packaging machine 1 includes on an inner side thereof an entrance surface 88a, a pressure surface 88b, and an exit surface 88c, which are formed continuously. Accordingly, the locus that the seal jaw 78 draws as it moves while the partial cam follower 78a engages the partial cam 88 is smooth, consequently, less power is required from the motor 71 to rotate the seal jaw 78. Additionally, since the pressure surface 88b of this embodiment includes the entrance surface 88a and the exit surface 88c at the top and bottom thereof, the cam follower 78a can can smoothly engage and disengage the partial cam 88, without disrupting rotation of the partial cam follower 78a (See FIG. 14). Accordingly, even less power is required from the motor 71.

Figure 15:
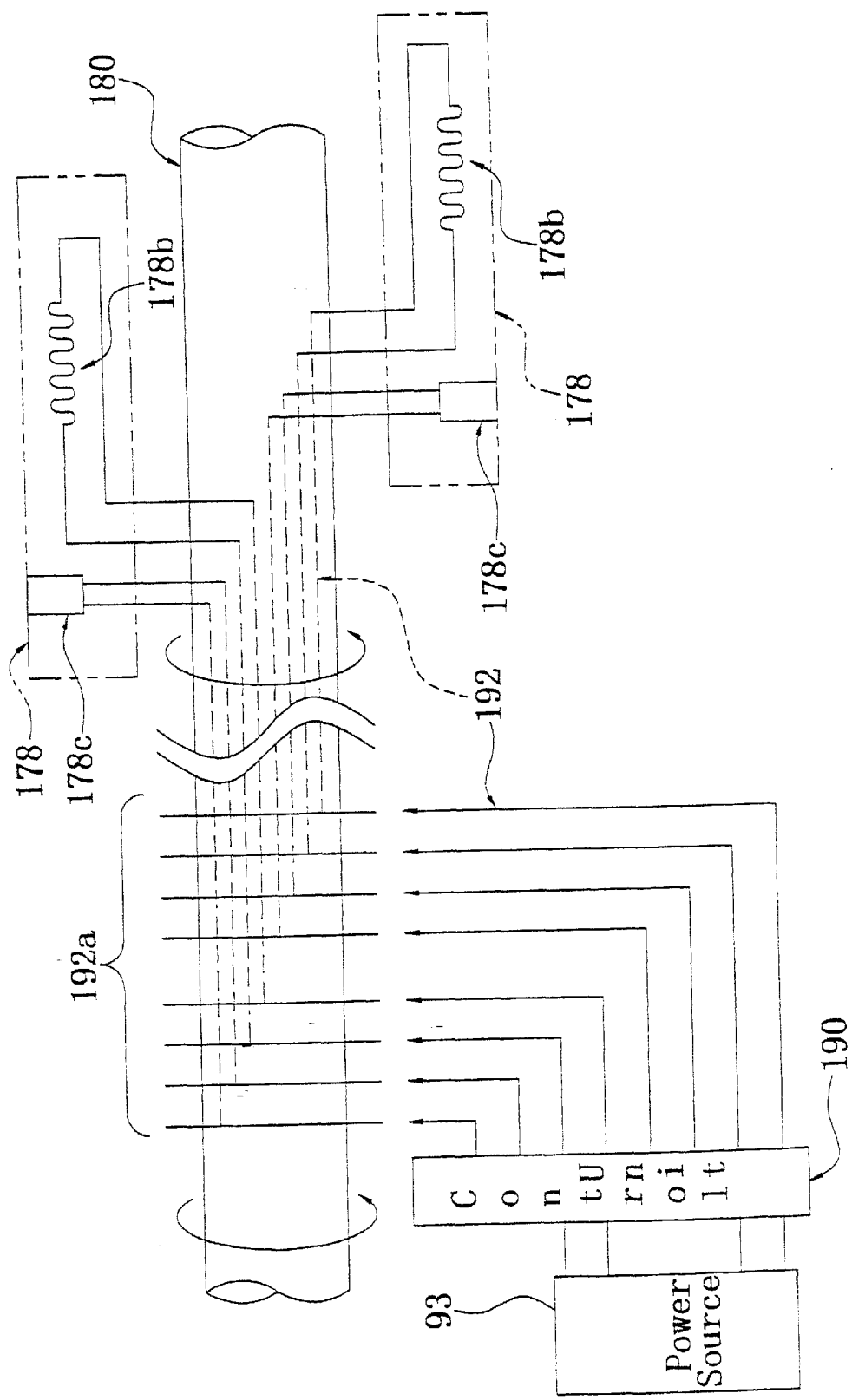
FIG. 15 is a schematic view of conventional heating control system used in the present invention.

(7) In a conventional latitudinal seal mechanism, an external control unit 190 is disposed apart from a structure that rotates about the rotational shaft 180, as shown in FIG. 15. Accordingly, there has to be a slip ring 192 on distribution lines that connects the external control unit 190 and devices inside the seal jaw 178 of the latitudinal seal mechanism, such as the heaters 178b and the thermometers 178c. When more than one seal jaws 178 are disposed on one rotational shaft 180 as shown in FIG. 15, the number of poles of the slip rings 192a has to be increased accordingly. For instance, if there are two seal jaws 178 as shown in FIG. 15, four power lines for supplying power to each heater 178b and four signal lines to retrieve signal from each thermometer 178c are needed. In other words, there have to be eight poles of slip rings 192a.

On the other hand, the latitudinal seal mechanism 17 of the bag packaging mechanism 1 of the present invention shown in FIG. 9 has a structure in which the control unit 90 rotates together with the rotational shaft 80. Therefore, there is no relative rotation between the control unit 90 and devices that rotate with the rotational shaft 80, such as the heater 78b and the thermo couples 78c that control the heater 78b. Accordingly, no slip ring is needed on the distribution lines that lie between the heater 78b and the control unit 90, and between the thermo couples 78c and the control unit 90. The only slip ring needed is the slip ring 92a for supplying power from the external power source 93 to the control unit 90. Reducing the number of poles of the slip ring 92a reduces the overall cost. Further, by not disposing a slip ring on compensating lead wires, noises can be prevented. Therefore more reliable control is assured.

(8) The latitudinal seal mechanism 17 of the bag packaging mechanism 1 assigns to each heater 78b a time period in which the heater 78b is supplied with power. Therefore, only two poles of the slip ring 92a on the power supply lines 92 suffice. Also, the slip ring 92a only needs limited capacity.

Second Embodiment

In the first embodiment, the rotational shafts 80 are supported by the bearings 81a fixed to the sliders 81 which are adapted to slide along the rails 82, such that the rotational shafts 80 are movable in the direction of the horizontal beams 25a and 25b. However, as shown in FIG. 17, the rotational shafts 80 can also be supported such that the rotational shafts 80 can move rotationally drawing an arc.

Figure 17:
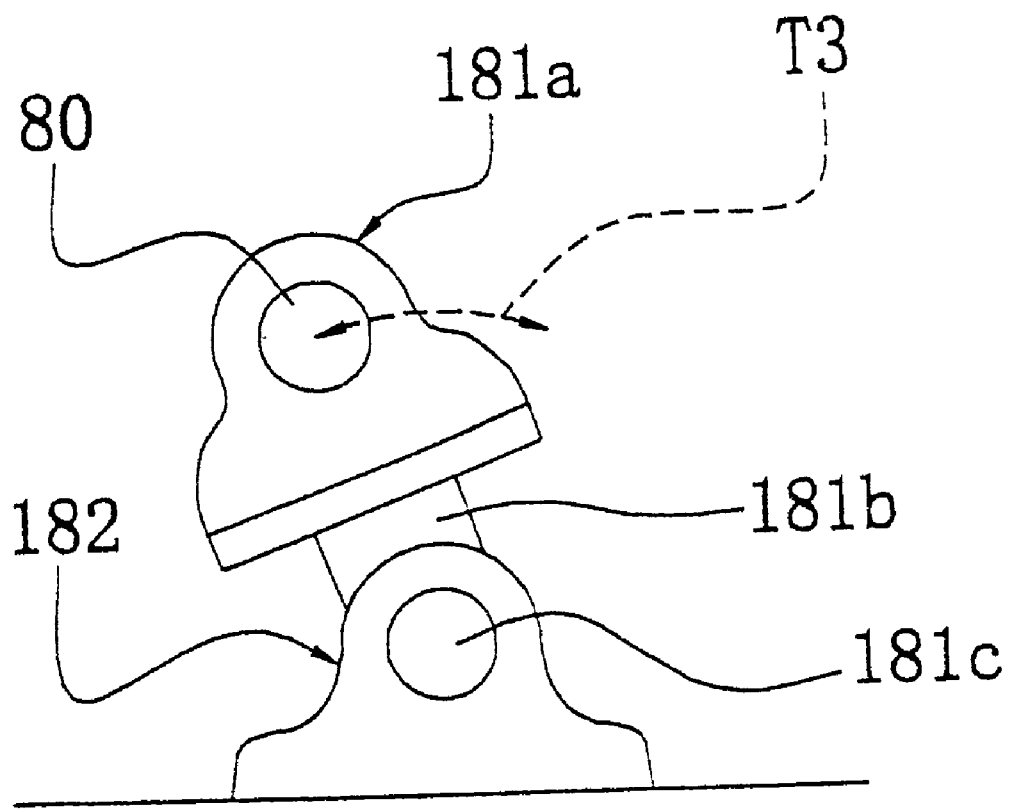
FIG. 17 is a schematic view of support mechanism that supports a rotational shaft in accordance with the second embodiment of the present invention.

In the example shown in FIG. 17, the rotational shaft 80 is pivotably supported by a bearing 181a. The bearing 181a has an arm 181b fixed thereto. A pin 181c is fixed to a bottom end of the arm 181b. The pin 181c is pivotably supported by another bearing 182, which is supported by the support frame 12. In other words, the rotational shaft 80 is rotatable about the pin 181c, while being rotatably supported by the bearing 181a.

Figure 16:
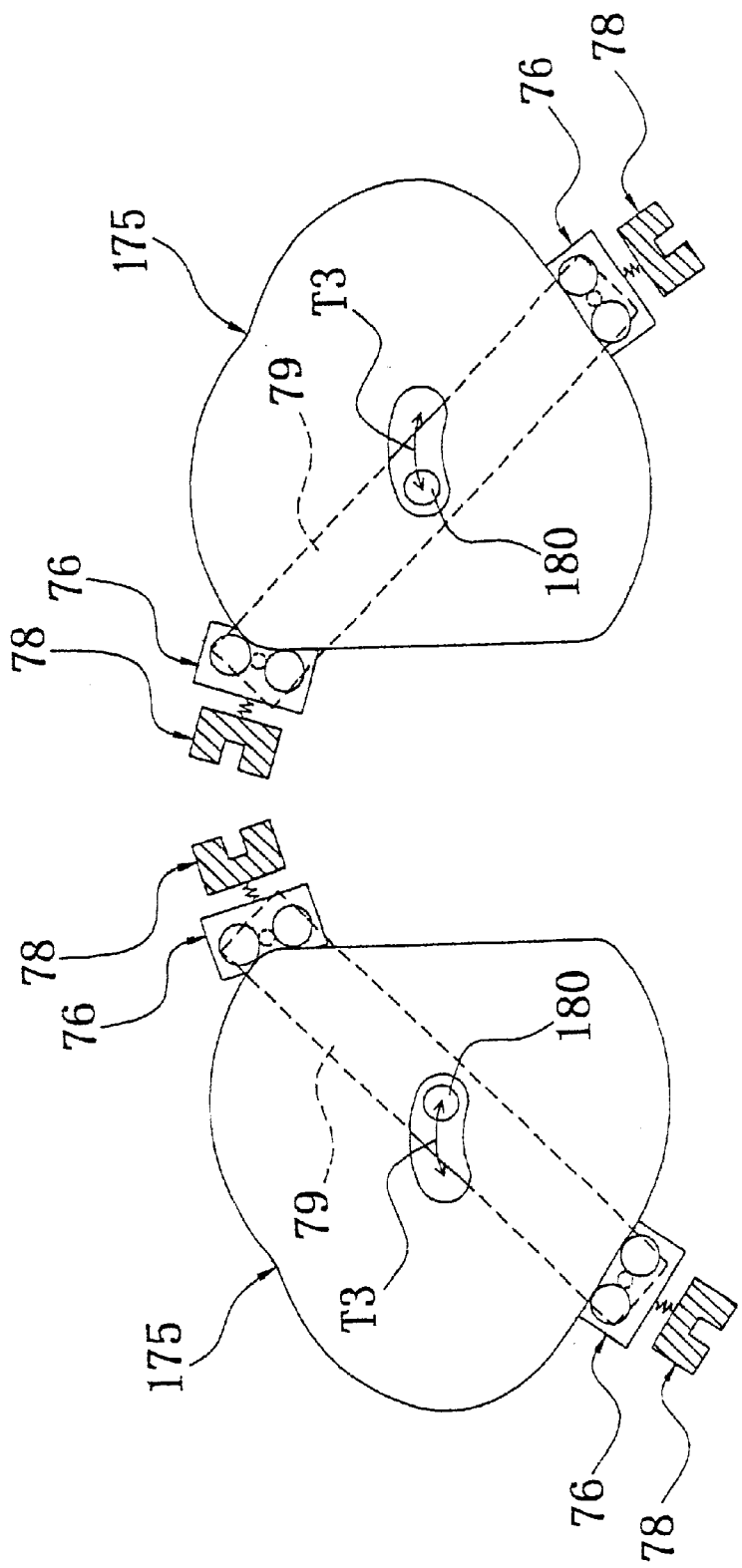
FIG. 16 is a view of fixed cams in accordance with a second embodiment of the present invention.

The rotational shaft 80 supported in the aforementioned manner can move in the direction of the horizontal beams 25a and 25b drawing an arc-shaped locus T3, as the two cam followers 76 rotate. The two cam followers 76 are coupled to a fixed cam 175, such as the one shown in FIG. 16. The coupling member 79 connects the cam followers 79 and the rotational shaft 180, such that the rotational shaft 180 moves following rotation of the cam followers 67. More specifically, the rotational shaft 180 repeats stopping at the inner position and arc-shaped back and forth movement.

This arrangement can also eliminate a structure in which the cam followers 76 and the coupling member 79 slide against each other, by moving the rotational shaft 80. Consequently, the sliding portion becomes more durable.

Third Embodiment

In the first embodiment, two cam followers 76 are disposed for each fixed cam 75. If only one cam follower 76 is to be disposed for each fixed cam 75, the fixed cam 75 can be a groove cam with the cam follower 76 engaging the groove. Alternatively, the second cam follower without a seal jaw can be disposed such that the two cam followers oppose each other across the rotational shaft 80.

Although the first embodiment discloses a fixed cam 75 having two cam followers 76, a fixed cam 75 can have three or more cam followers 76 to further increase the speed of processing.

Fourth Embodiment

In the first embodiment, the present invention has been applied to a latitudinal seal mechanism where the fixed cams 75 and the cam followers 76 through the motor 71 let the seal jaws 78 draw a locus in the shape of letter D. The present invention can also be applied to a latitudinal seal mechanism where two kinds of motors (rotational motor and horizontal motor) move seal jaws so as to draw a locus of letter D, as disclosed in Japanese Laid-Open Patent Application 10-86910.

In that case, sealing pressure can be generated by the partial cams and the partial cam followers, and by the link mechanism and the air cylinder. Therefore, the horizontal motor does not need to be able to generate torque that is comparable to the sealing pressure. Therefore, a motor with small torque capacity can function as the horizontal motor.

Referring to FIG. 8, by making the entrance surfaces 88a inclined by small angle relative to the vertical direction, even a low-powered rotational motor can rotate the seal jaws and partial cam followers, pushing the seal jaws and partial cam followers against the sealing pressure.

In this manner, when the present invention is applied to a latitudinal seal mechanism disclosed in Japanese Laid-Open patent application 10-86910, the rotational motor and horizontal motor can be reduced in size. Therefore, cost of bag packaging machine can be reduced accordingly.

Fifth Embodiment

In the first embodiment, the rotational shafts 80 move relative to the fixed cams 75. The seal jaws 78 can move so as to draw a locus in the shape of letter D, by eliminating relative movement between the fixed cams 75 and the rotational shafts 80, and instead having the coupling members 79 and the cam followers 76 slide against each other. This embodiment also has the aforementioned effects of the present invention.

Effect of Invention

This invention generates sealing pressure without causing much burden to driving means that moves the seal portion circularly, by use of a pair of partial cams and partial cam followers that engage each partial cams. In other words, in the present invention, sealing pressure can be easily secured in the latitudinal seal mechanism by use of partial cams and partial cam followers.

Also, according to another aspect of the present invention, since magnitude of pressure applied to the partial cams by the pressure means via the pressure adjustment means is adjustable, the magnitude of sealing pressure can be adjusted, or it can be adjusted that the latitudinal seal mechanism does not seal at all.

Since the rotational shaft moves relative to the fixed cam in this invention, there is more flexibility as to where the sliding structure (shaft support portion) can be disposed. Additionally, the present invention eliminates the structure in which the coupling member fixed to the rotational shaft and the cam follower slide against each other.

While several embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A latitudinal seal mechanism for use in a bag packaging mechanism that fills articles to be packaged while sealing a tubular packaging material in longitudinal and latitudinal directions, said latitudinal sealing mechanism comprising:

a pair of fixed cams fixedly supported in the bag packaging mechanism;

a pair of seal members coupled to said pair of fixed cams, each of said seal members being arranged and configured to move about one of said fixed cams in a generally circular path;

first and second partial cam followers supported on said seal members;

first and second partial cams having first and second surfaces that are selectively engageable with said first and second partial cam followers, respectively, for selectively moving said seal members toward one another, such that said seal members engage and hold a portion of the tubular packaging material between said seal members as said seal members approach one another; and a link mechanism that connects said first partial cam to said second partial cam.

2. The latitudinal seal mechanism as set forth in claim 1, further comprising pressure means for applying pressure to said first and second partial cams such that said seal members press against each other with said seal members holding the tubular packaging material therebetween.

3. The latitudinal seal mechanism as set forth in claim 2, further comprising pressure adjustment means for adjusting a magnitude of pressure that said pressure means applies to said first and second partial cams.

4. A latitudinal seal mechanism for use in a bag packaging mechanism that fills articles to be packaged while sealing a tubular packaging material in longitudinal and latitudinal directions, said latitudinal sealing mechanism comprising:

a pair of fixed cams fixedly supported in the bag packaging mechanism;

a pair of seal members coupled to said pair of fixed cams, each of said of seal members being arranged and configured to move about one of said fixed cams in a generally circular path;

first and second partial cam followers supported on said seal members;

first and second partial cams having first and second surfaces that are selectively engageable with said first and second partial cam followers, respectively, for selectively moving said seal members toward one another, such that said seal members engage and hold a portion of the tubular packaging material between said seal members as said seal members approach one another, said first and second partial cams being connected via a link mechanism;

pressure means for applying pressure to said first and second partial cams such that said seal members press against each other with said seal members holding the tubular packaging material therebetween, said pressure means applying force to a portion of said link mechanism in a direction perpendicular to a direction in which said seal members move to press against each other; and pressure adjustment means for adjusting a magnitude of pressure that said pressure means applies to said first and second partial cams.

5. The latitudinal seal mechanism as set forth in claim 4, wherein said first and second partial cams include respective opposing surfaces, each of said opposing surfaces has an entrance surface, a pressure surface, and an exit surface, said pressure surface being formed immediately below said entrance surface, said exit surface being formed immediately below said pressure surface, said seal members receiving no pressure applied thereto while said first and second partial cam followers engage said entrance surfaces, said seal members being pressed against each other while said first and second partial cam followers engage said pressure surfaces, said seal members receiving no pressure applied thereto while said first and second partial cam followers engage said exit surfaces.

6. A latitudinal seal mechanism for use in a bag packaging mechanism that fills articles to be packaged while sealing a tubular packaging material in longitudinal and latitudinal directions, said latitudinal sealing mechanism comprising:

a pair of fixed cams fixedly supported in the bag packaging mechanism;

a pair of seal members coupled to said pair of fixed cams, each of said seal members being arranged and configured to move about one of said fixed cams in a generally circular path, each of said fixed cams having a shape corresponding to one of the circular paths followed by said seal members;

partial cam followers supported on respective ones of said seal members;

a pair of partial cams having surfaces that are selectively engageable with said partial cam followers for selectively moving said seal members toward one another, such that said seal members engage and hold a portion of the tubular packaging material between said seal members as said seal members approach one another; said pair of partial cams being connected to each other via a link mechanism; said pair of partial cams including respective opposing surfaces, each of said opposing surfaces having an entrance surface, a pressure surface, and an exit surface, said pressure surface being formed immediately below said entrance surface, said exit surface being formed immediately below said pressure surface, said seal members receiving no pressure applied thereto while said partial cam followers engage said entrance surfaces, said seal members being pressed against each other while said partial cam followers engage said pressure surfaces, said seal members receiving no pressure applied thereto while said partial cam followers engage said exit surfaces;

pressure means for applying pressure to said partial cams such that said seal members press against each other with said seal members holding the tubular packaging material therebetween, said pressure means applying force to a portion of said link mechanism in a direction perpendicular to a direction in which said seal members move to press against each other;

pressure adjustment means for adjusting a magnitude of pressure that said pressure means applies to said partial cams;

cam followers coupled between said seal members and said fixed cams, such that said seal members are engageable with said fixed cams; and driving means for moving said cam followers.

7. The latitudinal seal mechanism as set forth in claim 6, wherein each of said cam followers supports one of said seal members via an elastic member that is extendable in response to said partial cam follower supported on said one of said seal members engaging one of said partial cams.

8. The latitudinal seal mechanism as set forth in claim 7, wherein said driving means moves said cam followers via at least one rotational shaft and at least one coupling member, said driving means rotating said rotational shaft, said rotational shaft rotating said cam followers relatively circularly about a rotational center of said rotational shaft, said coupling member connecting said rotational shaft and said cam followers; and said rotational shaft being arranged and configured to move relative to one of said fixed cams in a direction perpendicular to a length of said rotational shaft, due to movement of said seal members and said cam followers.

9. The latitudinal seal mechanism as set forth in claim 8, wherein said seal members slide along a portion of the tubular packaging material in response to movement of said cam followers with a predetermined gap maintained between said seal members prior to said partial cam followers engaging said partial cams, and said seal members sealing the tubular packaging material by holding the tubular packaging material therebetween while said partial cam followers engage said partial cams.

10. The latitudinal seal mechanism as set forth in claim 9, wherein a speed at which said driving means moves said cam followers while said seal members slide on the tubular packaging material is faster than a speed at which said driving means moves said cam followers as said seal members hold the tubular packaging material therebetween.

11. A bag packaging mechanism that fills articles to be packaged while sealing a tubular packaging material in longitudinal and latitudinal directions, said bag packaging mechanism comprising:

forming means for forming a sheet-shaped packaging material supplied thereto in a tubular shape while receiving the articles to be packaged;

a packaging material conveyance mechanism for conveying the tubular packaging material in a downward direction;

a longitudinal seal mechanism for sealing in a longitudinal direction overlapping portions of the tubular packaging material conveyed thereto; and a latitudinal seal mechanism for sealing in a latitudinal direction portions of the tubular packaging material conveyed thereto with a predetermined distance therebetween, said latitudinal seal mechanism comprising:

a pair of fixed cams fixedly supported in the bag packaging mechanism;

a pair of seal members coupled to said pair of fixed cams, each of said seal members being arranged and configured to move about one of said fixed cams in a generally circular path;

partial cam followers supported on respective ones of said seal members;

a pair of partial cams having surfaces that are selectively engageable with said partial cam followers for selectively moving said seal members toward one another, such that said seal members engage and hold a portion of the tubular packaging material between said seal members as said seal members approach one another; and a link mechanism that connects said pair of partial cams together.

* * * * *